US012493900B2

(12) United States Patent
Rosas-Maxemin et al.

(10) Patent No.: US 12,493,900 B2
(45) Date of Patent: Dec. 9, 2025

(54) IMAGE-BASED PARKING RECOGNITION AND NAVIGATION

(71) Applicant: Pied Parker, Inc., Sacramento, CA (US)

(72) Inventors: Gianni Rosas-Maxemin, Sacramento, CA (US); Robert Mazzola, Sacramento, CA (US); Francisco Sandoval, Sacramento, CA (US); Callam Poynter, Sacramento, CA (US); Noah Kindler, Palo Alto, CA (US)

(73) Assignee: Pied Parker, Inc., Sacramento, CA (US)

( * ) Notice: Subject to any disclaimer, the term of this patent is extended or adjusted under 35 U.S.C. 154(b) by 0 days.

(21) Appl. No.: 18/509,248

(22) Filed: Nov. 14, 2023

(65) Prior Publication Data

US 2024/0086982 A1    Mar. 14, 2024

Related U.S. Application Data

(63) Continuation of application No. 16/730,999, filed on Dec. 30, 2019, now Pat. No. 11,816,709.
(Continued)

(51) Int. Cl.
*G06Q 50/40*        (2024.01)
*G06N 20/00*        (2019.01)
*G06Q 30/0283*      (2023.01)

(52) U.S. Cl.
CPC ......... *G06Q 30/0284* (2013.01); *G06N 20/00* (2019.01); *G06Q 50/40* (2024.01)

(58) Field of Classification Search
CPC .... G06Q 30/0284; G06Q 50/30; G06Q 50/40; G06Q 50/43; G06Q 50/47; G06N 20/00
See application file for complete search history.

(56) References Cited

U.S. PATENT DOCUMENTS 7,956,769 B1    6/2011  Pearl
10,262,535 B2   4/2019  Felix et al.
(Continued)

FOREIGN PATENT DOCUMENTS

KR    20060114825 A    11/2006
WO    WO 2018232991 A1    12/2018

OTHER PUBLICATIONS

H. Bura, N. Lin, N. Kumar, S. Malekar, S. Nagaraj and K. Liu, "An Edge Based Smart Parking Solution Using Camera Networks and Deep Learning," 2018 IEEE International Conference on Cognitive Computing (ICCC), San Francisco, CA, USA, 2018, pp. 17-24 ( Year: 2018).*

(Continued)

*Primary Examiner* — Jeff Zimmerman
*Assistant Examiner* — Wayne S. Murray
(74) *Attorney, Agent, or Firm* — Straylight LLP

(57) ABSTRACT

Image-based parking recognition and navigation systems and methods are disclosed. An example method includes: obtaining camera data collected by the plurality of cameras, the image data identifying one or more parking locations; analyzing the camera data in accordance with one or more machine learning techniques to identify a plurality of candidate parking location, obtaining, from a smart phone app executed on a mobile user device, a user request to reserve a candidate parking location in the plurality of candidate parking location; determining a location of the candidate parking location based on location data associated with a first camera; identifying a booking method to reserve the candidate parking location based on the location of the candidate parking location; and responsive to obtaining the user request, enabling a user issuing the user request to reserve the candidate parking location through smart phone app executed on the mobile user device.

19 Claims, 9 Drawing Sheets

Related U.S. Application Data

(60) Provisional application No. 62/840,999, filed on Apr. 30, 2019, provisional application No. 62/786,006, filed on Dec. 28, 2018.

(56) References Cited

U.S. PATENT DOCUMENTS

| | | | |
|---|---|---|---|
| 10,262,537 | B1 | 4/2019 | Kim et al. |
| 10,373,226 | B1* | 8/2019 | Russell .............. G06Q 30/0635 |
| 2005/0084134 | A1* | 4/2005 | Toda ...................... G08G 1/017 |
| | | | 382/105 |
| 2006/0255119 | A1 | 11/2006 | Marchasin et al. |
| 2012/0130872 | A1* | 5/2012 | Baughman ............ G07F 17/246 |
| | | | 340/932.2 |
| 2012/0147190 | A1 | 6/2012 | Ioli |
| 2012/0265585 | A1 | 10/2012 | Muirbrook et al. |
| 2012/0274482 | A1* | 11/2012 | Chen ...................... G08G 1/144 |
| | | | 340/932.2 |
| 2012/0323643 | A1 | 12/2012 | Volz |
| 2013/0113936 | A1 | 5/2013 | Cohen et al. |
| 2014/0039987 | A1 | 2/2014 | Steven et al. |
| 2014/0257943 | A1* | 9/2014 | Nerayoff ................ G08G 1/144 |
| | | | 382/104 |
| 2014/0278839 | A1 | 9/2014 | Lynam et al. |
| 2015/0009047 | A1 | 1/2015 | Ashkenazi et al. |
| 2015/0088792 | A1 | 3/2015 | O'Neill et al. |
| 2015/0138001 | A1 | 5/2015 | Davies et al. |
| 2016/0189324 | A1 | 6/2016 | Eramian et al. |
| 2016/0196702 | A1* | 7/2016 | Wilson ................... G07B 15/02 |
| | | | 340/5.7 |
| 2016/0232500 | A1* | 8/2016 | Wang ...................... H04N 7/18 |
| 2016/0328971 | A1 | 11/2016 | Nakhjavani et al. |
| 2017/0109942 | A1* | 4/2017 | Zivkovic ............ G06Q 20/3278 |
| 2017/0365170 | A1 | 12/2017 | Lazic et al. |
| 2018/0211539 | A1 | 7/2018 | Boss et al. |
| 2018/0268322 | A1 | 9/2018 | Liu |
| 2018/0286236 | A1 | 10/2018 | Mazzola et al. |
| 2019/0147368 | A1 | 5/2019 | Pinel et al. |
| 2019/0266561 | A1 | 8/2019 | Koeppel et al. |
| 2019/0294889 | A1* | 9/2019 | Sriram ............... G06V 10/7625 |
| 2020/0143682 | A1 | 5/2020 | Chow |
| 2020/0219390 | A1* | 7/2020 | Lyles ..................... G07B 15/02 |

OTHER PUBLICATIONS

International Search Report and Written Opinion, dated Jul. 23, 2020, for the corresponding International Application No. PCT/US2020/030885 in 8 pages.

IBM. "IBM Global Parking Survey: Drivers Share Worldwide Parking Woes." Sep. 28, 2011 (Sep. 28, 2011) Retrieved on Jul. 6, 2020 (Jul. 6, 2020) from <https://www-03.ibm.com/press/us/en/pressrelease/35515.wss> entire document.

INRIX. "Searching for Parking Costs Americans $73 Billion a Year." Jul. 12, 2017 (Jul. 12, 2017) Retrieved on Jul. 6, 2020 (Jul. 6, 2020) from <https://inrix.com/press-releases/parking-pain-us/> entire document.

Tschentscher, M., et al., "Comparing Image Features and Machine Learning Algorithms for Real-Time Parking Space Classification", Aug. 6, 2013, Computing in Civil Engineering. (Year: 2013).

Y. Geng and C. G. Cassandras, "New "Smart Parking" System Based on Resource Allocation and Reservations," in IEEE Transactions on Intelligent Transportation Systems, vol. 14, No. 3, pp. 1129-1139, Sep. 2013, doi: 10.1109/TITS.2013.2252428. (Year: 2013).

* cited by examiner

IMAGE-BASED PARKING RECOGNITION AND NAVIGATION

RELATED APPLICATIONS

This application claims the benefit of U.S. Provisional Application No. 62/786,006, filed Dec. 28, 2018; this application also claims the benefit of U.S. Provisional Application No. 62/840,999, filed Apr. 30, 2019. Both of the above-identified patent applications are hereby incorporated by reference in their entireties.

TECHNICAL FIELD

The present disclosure relates generally to detecting wireless devices, and more specifically, to image-based parking recognition and navigation.

BACKGROUND

Parking a vehicle in densely populated environments is often a frustrating and time-consuming experience, with few available parking spaces and major street congestion. This problem is further exacerbated by an increase of cars on the road. A poll of 2,000 adults revealed that 44% of motorists say finding parking is a stressful experience. In Great Britain, for example, drivers waste nearly four days every year looking for parking, a study has found. The Telegraph, *Motorists Spend Four Days a Year Looking for Parking*, available at https://www.telegraph.co.uk/news/2017/02/01/motorists-spend-four-days-year-looking-parking-space;. Looking further afield, nearly three out of four commuters surveyed in Shenzhen, Beijing, Nairobi, Singapore, and Mexico reported not reaching their intended destination because they have up looking for parking near their destination, according to a global survey by IBM in 2008. IBM, *IBM Global Parking Survey: Drivers Share Worldwide Parking Woes*, available at https://www-03.ibm.com/press/us/en/pressrelease/35515.wss. Seventeen percent of drivers in Milan and Beijing and 16 percent of drivers in Madrid and Shenzhen spent 31 to 40 minutes looking for parking. Id.

Just in the U.S. alone, costs to a city as a result of parking are approximately $73 billion per year, combining impact to the driver and impact to the city, in the search for parking in wasted time, fuel and emissions according to a recent study of 6,000 respondents. Inrix, *Searching for Parking Costs Americans $73 Billion a Year*, available at http://inrix.com/press-releases/parking-pain-us/. This is especially painful in populated urban environments such as the downtown areas of large municipalities (e.g., New York City, San Francisco, etc.). Moreover, parking is often in high demand near destinations or event venues such as neighborhoods surrounding sports stadiums, concert halls, amusement parks, or beach fronts.

Using parking applications, smartphone owners may use on-demand parking systems to pay property owners for use of their parking space(s). However, applications rely on user input to determine arrival and departure of vehicles in parking spaces, or on expensive sensors in those parking spaces, and often there is unreliable data about the inventory available.

With traditional booking systems, a user may search for street parking and/or parking facilities and find out whether parking is available and pay for parking manually upon arrival. These systems often require expensive, inaccurate hardware and physical paper tickets for verifying payment, and do not provide any advanced notice of availability or payment before arrival. These systems are outdated, slow, and inaccurate.

SUMMARY

An image-based parking recognition and navigation system and methods of operation are disclosed. According to one aspect, a system includes a non-transitory memory and one or more processors coupled thereto. The one or more processors are configured to execute instructions comprising: receiving image data captured using one or more cameras, the image data including portions of one or more listing locations, determining one or more listing location parameters associated with respective one or more listing locations based on machine learning identification of aspects of the image data, the one or more listing location parameters including listing location availability and location data; determining one or more listing locations correspond with one or more second listing locations stored in a listing location database based at least in part on comparing the respective one or more listing location parameters; selecting a first listing location based on the one or more listing location parameters and matching preferences to a first wireless device; and transmitting instructions to the first wireless device to direct a vehicle to the first listing location of the one or more listing locations based on the selection.

According to another aspect, the image data is captured from one or more image data sources. According to yet another aspect, the one or more image data sources include at least one of a group comprising one or more stationary cameras, one or more cameras on a vehicle, and parking sensors.

According to yet another aspect, selecting the first listing location is performed in response to receiving a search request from the first wireless device that includes one or more of the one or more listing location parameters.

According to yet another aspect, the instructions cause a vehicle to be autonomously directed to the first listing location. According to yet another aspect, the machine learning identification is performed using a machine learning model that is trained using image data from one or more image data sources, the one or more image data sources including at least one of a group comprising one or more stationary cameras, one or more cameras on a vehicle, and parking sensors. According to yet another aspect, the machine learning model is trained to identify parking space features.

According to another aspect, a method of image-based listing location detection includes a computing device coupled to a database including information about a plurality of listing locations, the computing device including one or more processors and memory storing one or more programs for execution by one or more processors. The one or more processors, when executing the one or more programs, are caused to perform a method comprising: receiving image data captured using one or more cameras, the image data including portions of one or more listing locations; determining one or more listing location parameters associated with respective one or more listing locations based on machine learning identification of aspects of the image data, the one or more listing location parameters including listing location availability and location data; determining one or more listing locations correspond with one or more second listing locations stored in a listing location database based at least in part on comparing the respective one or more listing location parameters; selecting a first listing location based on the one or more listing location parameters and matching preferences to a first wireless device; and transmitting instructions to the first wireless device to direct a vehicle to a first listing location of the one or more listing locations based on the selection.

According to yet another aspect, the instructions are transmitted using a mesh network.

According to yet another aspect, the image data is captured using one or more cameras including at least one of a group comprising one or more stationary cameras, one or more cameras on a vehicle, and one or more plenoptic cameras.

According to yet another aspect, the one or more listing location parameters are further determined based on audio data received from one or more vehicles.

According to yet another aspect, the machine learning identification is performed using a machine learning model that is trained using image data from one or more image data sources, the one or more image data sources including at least one of a group comprising one or more stationary cameras, one or more cameras on a vehicle, and parking sensor.

According to one aspect, a system includes a non-transitory memory and one or more processors coupled thereto. The one or more processors are configured to execute instructions comprising: receiving image data captured using one or more cameras, the image data including portions of one or more parking spaces; determining one or more parking space parameters associated with respective one or more parking spaces based on machine learning identification of aspects of the image data, the one or more parking space parameters including listing location availability and location data; determining one or more parking spaces correspond with one or more parking spaces stored in a parking space database based at least in part on comparing the respective one or more parking space parameters; receiving a search request from a first wireless device; selecting a first parking space for a first vehicle based on the one or more parking space parameters and matching preferences included in the search request; and transmitting instructions to the first wireless device to direct the first vehicle autonomously to the first parking space based on the selection, the instructions including a confirmation identifier, which, when transmitted by the first wireless device via short range wireless communication, causes a secured area to become unlocked.

According to yet another aspect, the first vehicle is dynamically assigned the first parking space within a parking lot. According to yet another aspect, the first parking space is defined in part by virtual boundaries.

According to yet another aspect, the location data includes GPS data.

According to yet another aspect, the one or more parking space parameters further include features of the one or more parking spaces including one or more parking restriction indicators.

According to yet another aspect, the secured area is a gate arm or garage.

According to yet another aspect, the short range wireless communication includes one of a group comprising a visual display of a quick response (QR) code, near field communication (NFC), BLUETOOTH, infrared, radio-frequency identification, and Wi-Fi.

Figure 1:
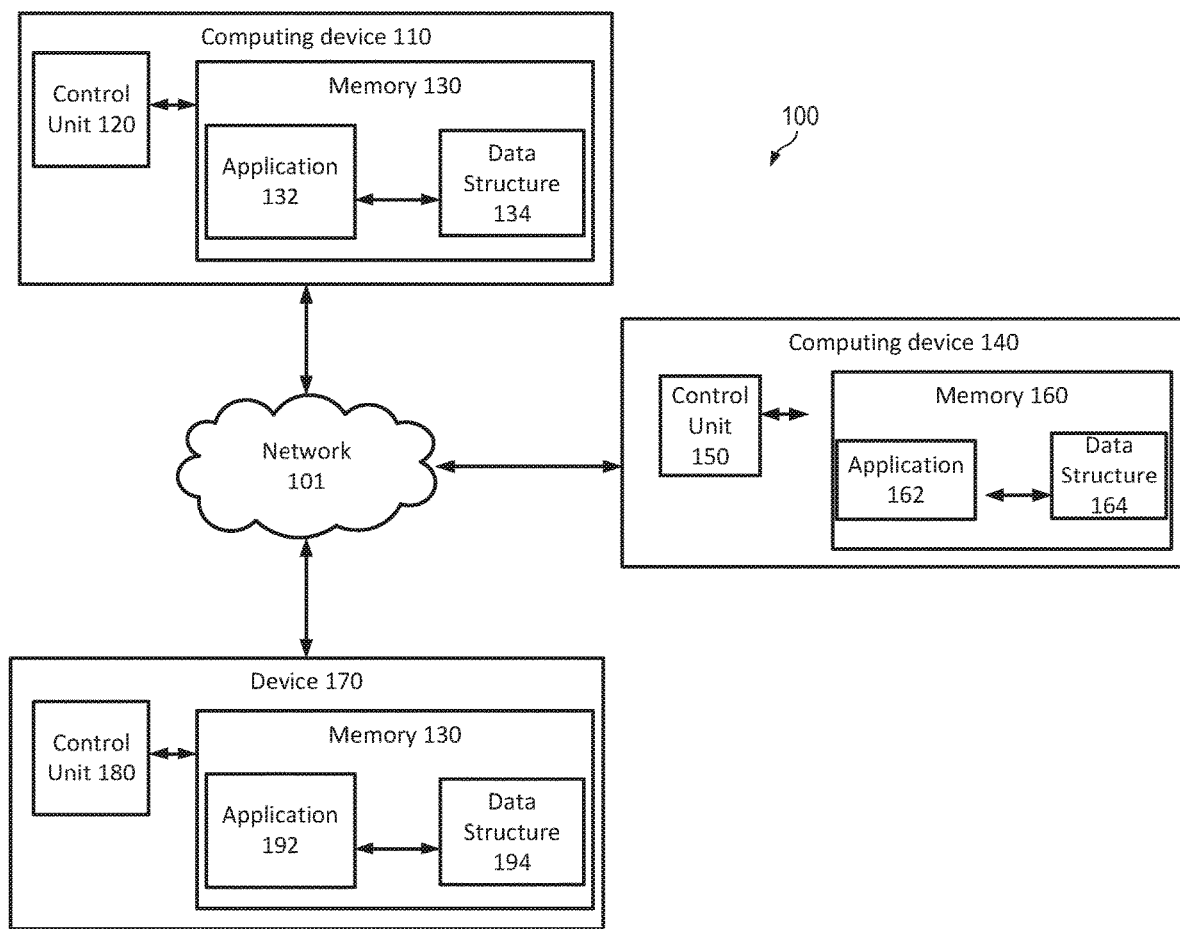
FIG. 1 is an example diagram of a distributed computing system according to some aspects.

In the figures, elements having the same designations have the same or similar functions.

DETAILED DESCRIPTION

In light of the problems associated with traffic and parking, it would be desirable to provide improved methods and systems of detecting and paying for parking spaces and providing vehicles and users with options to automatically reserve and navigate to parking spaces.

The foregoing problems are addressed by aspects of the subject technology that provide systems and methods for identifying available parking spaces based on image data, receiving a search request for a parking space, and securing a parking space for a vehicle based on the search request.

In practice, suppose that a vehicle is looking for parking and searches for parking using a wireless device application, such as PIED PARKER, that enables online payment for parking reservations. The wireless device may receive a notification or other message once it is close to a parking facility, the notification etc. may include a link to open up an application that enables such online payment for parking transactions. If the parking application is already downloaded, information about the user may be used to autocomplete parameters for a parking space request that may be automatically transmitted by the wireless device. This request may be sent to the parking application servers which process the transaction.

Once it is determined that a vehicle is looking for parking, image data gathered from multiple sources may be used to identify available parking spaces. The image data may be captured from cameras on other vehicles, cameras in a parking facility or along a street, and other parking sensors. The image data may be processed using machine learning algorithms, which may be trained to detect particular parking features, such as the presence or absence of a vehicle. Based on a recognition of the image and location information, the particular parking space in the image may be determined, for instance, by comparing information about the parking space with parking spaces in databases of parking spaces. A particular parking space may be a metered parking space or within a parking facility, for instance. Using an application, such as PIED PARKER, the particular parking space may be reserved for the vehicle. Payment may be facilitated for the parking space, such as a telephonic payment for a meter or payment for the parking space on an application using stored payment information. Instructions may be sent to the wireless device to provide for navigation to the parking space. In some cases, a driver of a vehicle need only confirm the parking space reservation when prompted, and a suitable parking space may be identified based on stored preferences and payment facilitated with little to no input from the driver, and then the driver may be directed to the parking space.

Upon entering and/or leaving a parking facility, a driver may receive a notification on their wireless device with the short-range wireless communication technology enabled. Opening the notification may open the parking application to allow the user to enter and/or exit the parking facility. In some aspects, the user may have set preferences to automatically confirm entrance and/or exit via the wireless device with or without prompt. In some examples, the parking application sends back verification of the reservation or the user may complete the verification for the parking space to be reserved within the parking facility. In some cases, the user may not have access to a data network upon entering the parking facility, and the parking space may be paid once a data network is available.

Such intelligent parking systems increase efficiency with respect to parking, facilitate autonomous parking of vehicles, reduce traffic, reduce accidents, diminish or eliminate the need for vehicle operator (i.e., user) input, more accurately predict parking needs, increase security, and lead to faster processing of parking transactions. By shortening the time spent looking for parking for vehicles, less cars will be on the road looking for parking, significantly decreasing traffic. Furthermore, intelligent parking systems decrease walking distance for users from their parking spot to their destination and decrease costs associated with parking.

FIG. 1 is a simplified diagram of a distributed computing system 100 according to some aspects. As shown in FIG. 1, system 100 includes three computing devices 110, 140, and 170. One of ordinary skill would appreciate that distributed computing system 100 may include any number of computing devices of various types and/or capabilities. In some aspects, computing devices 110, 140, and/or 170 may be any type of computing device including personal computers (e.g., laptop, desktop, smartphone, or tablet computers), servers web servers, database servers), network switching devices (e.g., switches, routers, hubs, bridges, and/or the like), vehicle-based devices (e.g., on-board vehicle computers, short-range vehicle communication systems, telematics devices), or mobile communication devices (e.g., mobile phones, portable computing devices, and/or the like), and/or the like, and may include some or all of the elements previously mentioned.

In some aspects, computing device 110 includes a control unit 120 coupled to memory 130; computing device 140 includes a control unit 150 coupled to memory 160; and computing device 170 includes a control unit 180 coupled to memory 190. Each of control units 120, 150, and/or 180 may control the operation of its respective computing device 110, 140, and/or 170. In some examples, control units 120, 150, and/or 180 may each include one or more processors, central processing units (CPUs), graphical processing units (CPUs), virtual machines, microprocessors, microcontrollers, logic circuits, hardware finite state machines (ESMs), digital signal processors (DSPs) application specific integrated circuits (ASICs), field programmable gate arrays (FPGAs), and/or the like and/or combinations thereof. In some examples, memory 130 may be used to store one or more applications and one or more data structures, such as an application 132 and data structure 134. In some examples, memory 160 may be used to store one or more applications and one or more data structures, such as an application 162 and data structure 164, and memory 190 may be used to store one or more applications and one or more data structures, such as an application 192 and data structure 194.

In some aspects, memories 130, 160, and/or 190 may each include one or more types of machine-readable media, including volatile and non-volatile memory. Some common forms of machine-readable media may include floppy disk, flexible disk, hard disk, magnetic tape, any other magnetic medium, CD-ROM, any other optical medium, punch cards, paper tape, any other physical medium with patterns of holes, ROM, PROM, EPROM, FLASH-EPROM, any other memory chip or cartridge, and/or any other medium from which a processor or computer is adapted to read. Some common forms of volatile memory include SRAM, DRAM, IRAM, and/or any other type of medium which retains its data while devices are powered, potentially losing the memory when the devices are not powered.

The data structures 134, 164, and/or 194 may vary in size, usage, and/or complexity depending upon the purposes of computing devices 110, 140, and/or 170 and/or applications 132, 162, and/or 192. In some aspects, when computing devices 110, 140, and/or 170 are network switching devices, such as switches, routers, hubs, bridges, and/or the like, the data structures 134, 164, and/or 194 may include one or more tables with forwarding and/or similar information. In some examples, these tables may include one or more virtual local area network (LAN) tables, link aggregation group (LAG) tables, layer 2 (L2) next hop tables, layer 3 (L3) routing tables, L3 forwarding information bases (FIBs), flow tables, and/or the like. Depending upon the networking environment of system 100 and/or the role of computing devices 110, 140, and/or 170 these tables may include anywhere from a few dozen entries to thousands, or even tens of thousands or more entries. In some examples, data from data structures 134, 164, and/or 194 may be retrieved, stored, or modified by a respective control unit in accordance with instructions which may be executed directly, e.g., machine code, or indirectly, e.g., scripts, by the respective control unit. The systems and methods of the present disclosure are not limited to any particular data structure.

In some aspects, computing devices 110, 140, and 170 may also be coupled together using a network 101. In some examples, one or more of computing devices 110, 140, and 170 may be connected via any type of wired or wireless connections, such as dedicated short-range communications (DSRC), satellite, fire wire, network, USB, Wi-Fi, radio-frequency identification (RFID), BLUETOOTH, GPS, Near Field Communication (NFC), Infrared (e.g., GSM infrared), and/or the like and/or using any suitable wireless communication standards and protocols, such as IEEE 802.11 and WiMAX. Network 101, including any intervening nodes, may be any kind of network including a local area network (LAN) such as an Ethernet, a wide area network (WAN) such as an internet, a virtual or non-virtual private network, and/or the like and/or combinations thereof.

In some aspects, network 101 may include any type of computing device including personal computers (e.g., laptop, desktop, smartphone, or tablet computers), servers (e.g., web servers, database servers), network switching devices (e.g., switches, routers, hubs, bridges), vehicle-based devices (e.g., on-board vehicle computers, short-range vehicle communication systems, telematics devices), or mobile communication devices (e.g., mobile phones, portable computing devices), and/or the like, and may include some or all of the elements previously mentioned. Computing devices 110, 140, and 170 through their applications, such as applications 132, 162, and/or 192, may use network 101 to exchange information and/or to provide services for each other. In some examples, computing device 140 may be used to provide backup and/or fail over services for computing device 110. In some examples, computing device 140 may be maintaining data structure 164 as a synchronized copy of data structure 134. In some examples, one or more of components of computing devices 110, 140, and 170, such as a control unit, may be located remotely.

In some aspects, computing devices 110, 140, and/or 170 may include an electronic display, the display may be an active matrix emitting diode (AMOLED), light-emitting diode (LED), organic LED (PLED), electrophoretic, liquid crystal, e-paper, and/or the like and/or combinations thereof.

In some aspects, computing devices 110, 140, and/or 170 may include various input and output (I/O) devices, such as a keyboard, a mouse, touchscreen, button inputs, microphone, motion sensor, eye sensor, video display, and/or the like.

Figure 2:
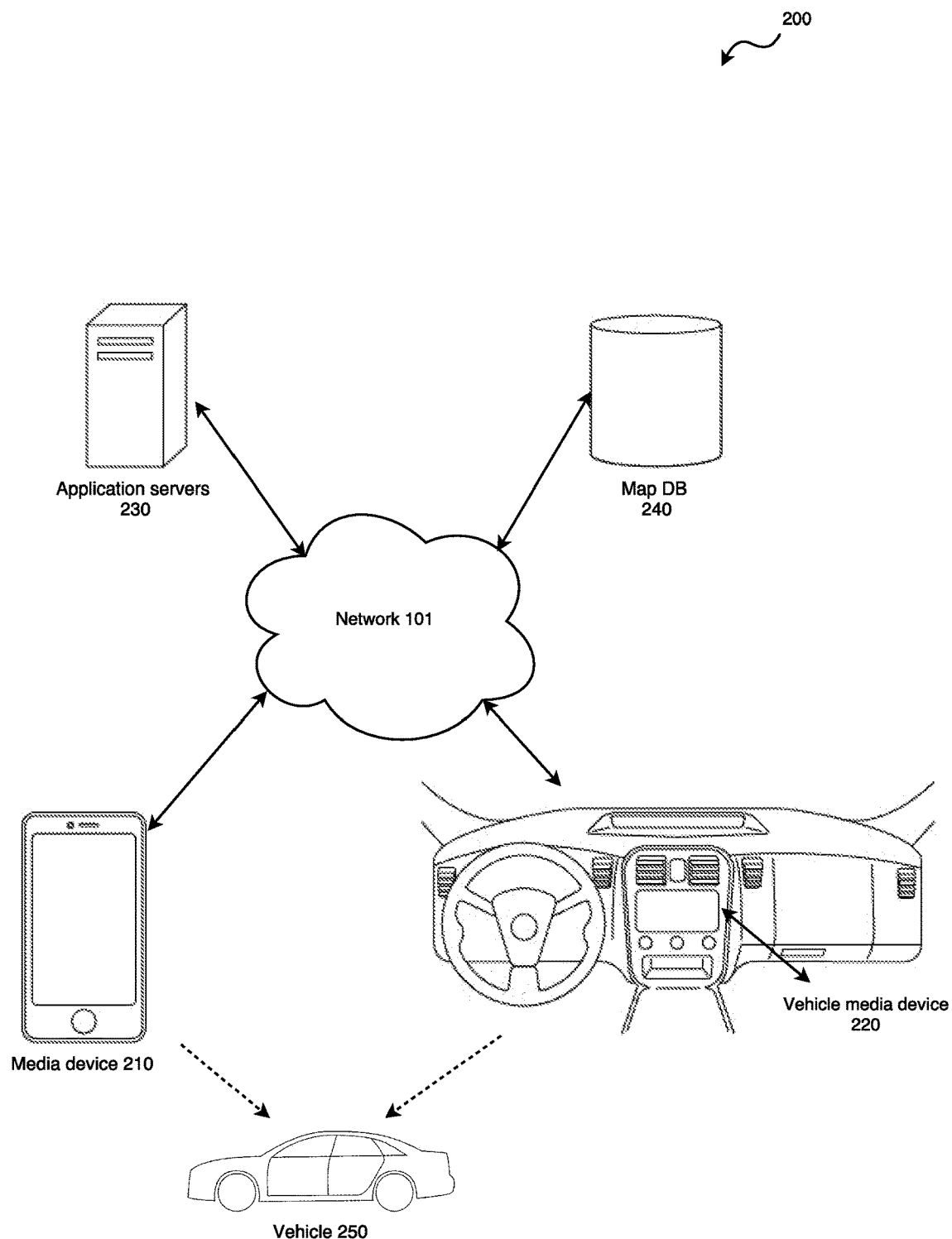
FIG. 2 is an example diagram of a distributed computing network according to some aspects.

FIG. 2 is a simplified diagram of a distributed computing system 200. In some aspects, as shown in FIG. 2, system 200 includes wireless device 210, vehicle device 220, application servers 230, map database 240, and vehicle 250. In some examples, media device 210 and/or vehicle device 220 may correspond to one or more of computing devices 110, 140, 170 and may be in communication with one another using network 101.

In some aspects, vehicle device 220 may be a device within vehicle 250, or may be part of the vehicle itself, such as an on-board vehicle computer. The vehicle may have more than one computing device. In some examples, vehicle device 220 may be mounted inside a vehicle, such as mounted to a dashboard of the vehicle. In some examples, the vehicle may be any type of vehicle, including a sedan, truck, SUV, motorcycle, scooter, self-balancing scooters (e.g., a SEGWAY), hoverboard, drone, bus, golf cart, train, trolley, amusement vehicle, recreational vehicle, boat, watercraft, helicopter, airplane, bicycle, and/or the like.

In some aspects, wireless device may include a display within a housing. In some examples, the housing may include several parts. In some examples, one part of the housing may include an optically transparent material, such as glass, and another part of the housing may include other materials, such as metallic materials (e.g., aluminum), and/or plastic, which may provide a robust support structure to prevent deformation of the display.

In some aspects, vehicle device 220 may establish communication with wireless device 210, or vice versa. In some examples, wireless device 210 automatically establishes communication with vehicle device 220, such as by connections between one or more of computing devices 110, 140, and 170. In some examples, wireless device 210 is automatically in communication with vehicle device 220 via wired connection. In some examples, wireless device 210 may contain its own power supply, or may be powered by a power supply within vehicle 250. In some examples, vehicle may charge wireless device 210 while in operation. In some examples, wireless device 210 may be charged wirelessly, e.g., on a wireless charging surface, such as on a dashboard of vehicle 250. Vehicle 250 may contain a transmitter for providing energy transmission and wireless device 210 may have a receiver for wireless power, whereby energy transfer occurs using magnetic resonant coupling. The transmitter may transmit power using multiple transmit coils and using parallel paths from such coils to multiple receive coils in the receiver.

In some aspects, vehicle device 220 and/or wireless device 210 may have access to a data repository including a sensor data structure, map database 240, a vehicle dynamics data structure, a listing location data structure, or historical data data structure. In some examples, a listing location may include any location that is made available (e.g., advertised) on a software application or is associated with a location made available, the location made available includes any real estate that is available for temporary licensing, leasing, renting, occupation of one or more vehicle parking locations, and/or the like, including a lot, garage (commercial or residential), and/or other location with a space suitable for occupation, including parking for a vehicle such as vehicle 250. In some examples, the sensor data structure may include information about available sensors, identifying information for the sensors, address information, internet protocol information, identifiers, data format, protocol used to communicate with the sensors, or a mapping of information type to sensor type or identifier. The sensor data structure may further include or store information collected by sensors, such as timestamps date stamps, and/or location stamps. The sensor data structure may categorize the sensor data based on one or more characteristics of listing locations. In some aspects, the vehicle dynamics structure can include vehicle dynamics information collected by vehicle device 220 and one or more sensors of vehicle 250. The listing location data structure can include listing location information about all listing locations and associated parameters.

In some aspects, vehicle 250 may be remotely controlled, may be partially or totally autonomous, such as partially or totally autonomous vehicle systems and methods disclosed in U.S. Pat. No. 9,330,571, which is incorporated by reference in its entirety. In some examples, vehicle 250 may contain one or more vehicle operation sensors. In some examples, wireless device 210 and vehicle device 220 may be included as vehicle operation sensors and may be configured to communicate with one or more external sensors. External sensors may include cameras, lasers, sonar, radar detection units (e.g., ones used for adaptive cruise control), magnetic sensors, infrared (IR) light transceivers, IR distance sensors, ultrasonic transmitters/detectors, and/or the like, and/or a combination thereof. In some examples, external sensors may provide data updated in real-time, updating output to reflect current environment conditions. Object detection and classification for autonomous vehicles may be performed according to aspects disclosed in U.S. Pat. No. 8,195,394, which is incorporated by reference in its entirety.

In some aspects, using data from external sensors, the cameras may be able to classify objects, identify pedestrians and cyclists, motor vehicles, overstaying vehicles, badly parked vehicles, blacklisted vehicles, license plates, parking lines, parking markers, parking signs, curbs, trees, roads, terrain, obstacles, side strips, bridge abutments, and road margins, traffic signs, and signals. In some aspects, using data from external sensors, listing locations may be identified. Using machine learning algorithms, a neural network may be trained to identify listing locations. Machine learning algorithms are explained in further detail in the discussion of FIG. 4.

In some aspects, data may also be collected from other sources, including one or more application servers 230. In some examples, traffic data may be received by one or more application servers 230.

In some aspects, map database 240 map data used to generate a path, or may integrate one or more APIs. Integrated API may include a geolocation, mapping, and a navigation application such as GOOGLE MAPS, APPLE MAPS, WAZE, and/or the like and/or combinations thereof. In some examples, application servers 230 may interact with a map or a geographic information system (GIS) database, such as map database 240, through a map API such as the GOOGLE MAPS API. In some examples, the application servers query the map or GIS database for traffic data in response to receiving the sensor data from the wireless device 210 and/or host device. In some examples, map database 240 may be an SQL database. The application servers 230 may interface with one or more servers managing the SQL database. Application data and application states may be stored in a cloud managed SQL database. In some examples, map database 240 may be a document-oriented database including a NoSQL database such as a MONGODB database.

Figure 3:
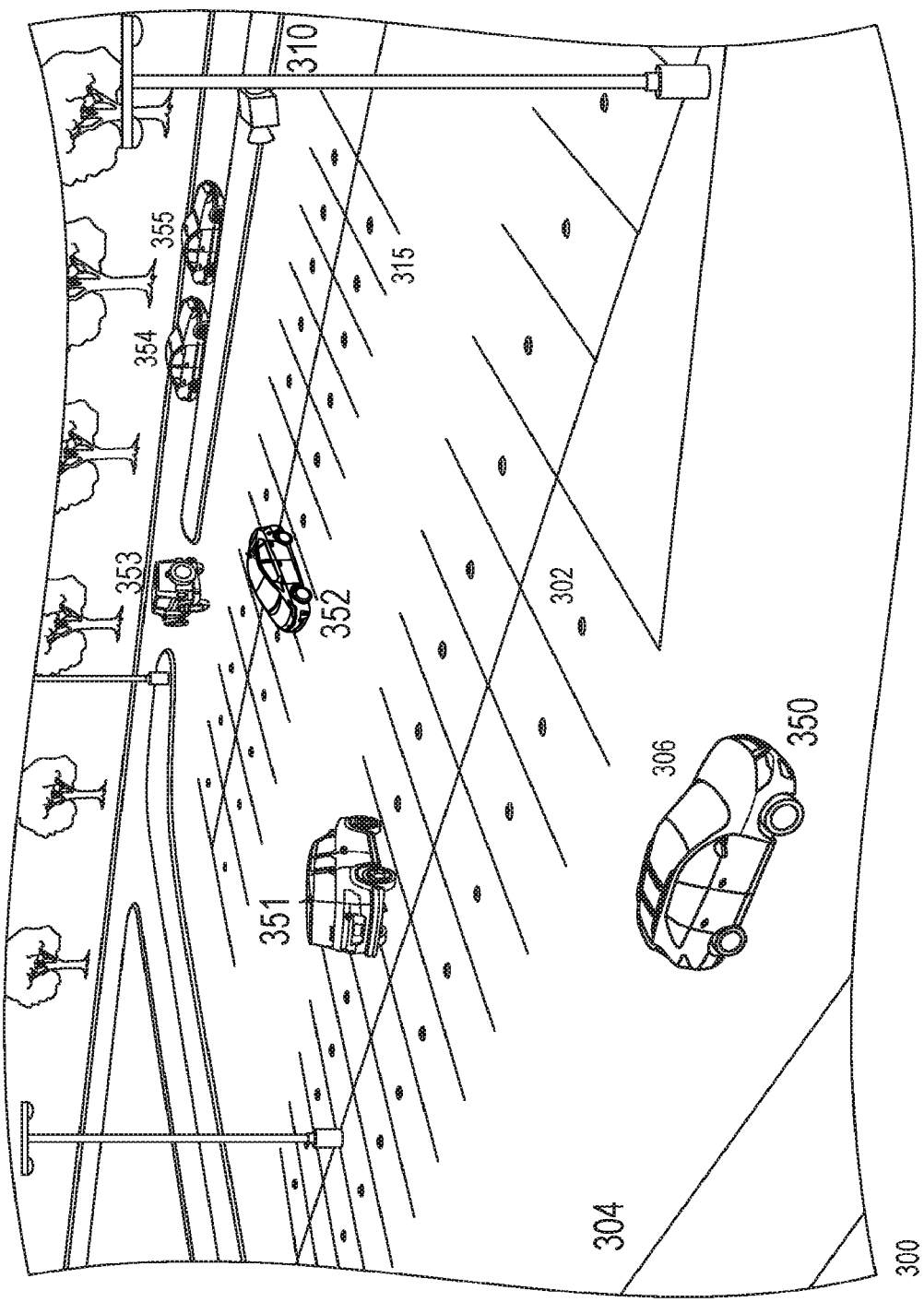
FIG. 3 is an example diagram of cameras overlooking a parking lot with vehicles and open parking spaces according to some aspects.

FIG. 3 is an example diagram of cameras overlooking a parking lot with vehicles and open parking spaces. In some aspects, geographic area 304 may include a lot, garage, space, and/or any other kind of property, such as one or more listing locations. In some aspects, a camera 310 is stationary or able to move in one or more directions. In some examples, camera 310 is able to capture still images and/or video. In some examples, camera 310 has a fisheye lens. In some examples, camera 310 is plenoptic. Camera 310 may be in communication with devices including parking sensors, vehicle devices, wireless devices, and/or the like and/or combinations thereof. In some examples, camera 310 is a 8-megapixel raspberry pi camera. In some examples, one or more vehicles 350-355 may correspond with vehicle 250. In some examples, camera 310 may correspond to one or more of computing devices 110, 140, 170. In some examples, wireless device 306 may correspond to one or more of computing devices 110, 140, 170, wireless device 210, and/or vehicle device 220. In some examples, wireless communication device 302 may correspond to one or more of computing devices 110, 140, 170.

In some aspects, virtual boundaries may include a geographic area 304. In some examples, when a wireless device enters and/or departs one or more virtual boundaries, it triggers the wireless device to receive a search request prompt for a listing location.

In some aspects, camera 310 may be in communication with wireless communication devices such as wireless communication device 302, which may transmit signals that include an identifier within the geographic area 304.

In some aspects, the wireless communication device 302 is one of the one or more computing devices with the capability to analyze the received signal strength index of a BLE beacon or similar BLE hardware transmitters. Said computing devices may triangulate the position of a wireless communication device 302 by, including but not limited to, edge computing or cloud computing. In some examples, wireless communication device 302 is a broadcast device, such as a beacon or other type of hardware transmitter. In some examples, wireless communication device 302. In some examples, wireless communication device 302 is a parking sensor, such as sensors described above with respect to FIG. 2.

In some examples, the bounds of the geographic area 304 may be defined by the signal range associated with wireless communication device 302. In some examples, the signal range is defined by the area in which the strength of the signal exceeds a threshold, such as −40 dBm. In some examples, the identifier includes information about wireless communication device 302 and information that may be recognized by a first software application installed on wireless device 306. In some examples, the identifier may be changed periodically, such as every second; identifiers may be changed for enhanced security. In some examples, the first software application actively monitors signals and compares identifiers included in those signals with those stored in a database. In some examples, signals are encoded or modulated according to predetermined parameters. In some examples, the database may include a cloud managed SQL database, such as a MICROSOFT AZURE database. In some examples, the first software application enables wireless devices to detect wireless communication devices such as beacons in proximity. In some examples, the first software application provides a digital coupon, boarding pass, event ticket, voucher, store card, credit card, loyalty card, debit card, and/or the like and/or combinations thereof that may also be called a pass. In some examples, an amount of a discount may be based on location, such as a specific parking garage, and based on an amount of traveling to such location from a starting location, such as number of miles traveled. In some examples, a digital coupon, such as with an added discount, may be sent in response to a reservation being scheduled from the starting location.

In some aspects, camera 310 is part of a vehicle detection method and system. Camera 310 may be used to capture images and/or video of geographic area 304 and, based on the images and/or video it listing locations parameters may be determined and updated. In some examples, camera 310 may capture areas including a specific parking space identifier 315 and such image/video may be used to determine whether a vehicle is parked in the parking space or not, what type of vehicle is parked in the parking space, a license plate number, parking space number, other objects or hazards in the parking space, whether vehicles are within designated parking spaces, and/or the like and/or combinations thereof. Camera 310 may be used in combination with other cameras or sensors to increase an accuracy of determined features such as the availability of the parking space. The processing functionality may include motion detection, background modeling, subtraction, occlusion detection, and/or the like and may be used to determine which frames and regions in one or more image frames occurred from a video.

In some examples, the determination of features within geographic area 304, such as parking space availability, and/or whether a search request prompt should be sent is performed using a machine learning (ML) model discussed below with respect to FIG. 4.

In some aspects, transmission of a search request may be delayed. In some examples, the search request is transmitted when wireless device 306 is able to access a network, when wireless device 306 detects that it is relatively stationary, such as when the speed of wireless device 306 is less than 5 miles per hour, when wireless device 306 detects that it is located at or near (e.g., <1 meter) one or more listing locations or another designated area, such as a temporary stopping location. In some examples, speed of wireless device 306 may be determined using an accelerometer, inertial unit, gyroscope, magnetometer, and/or the like and/or a combination thereof. In some examples, the inertial unit may be implemented as a multi-axis accelerometer including a three-axis accelerometer, a multi-axis gyroscope including a three-axis MEMS gyroscope, or a combination thereof. In some examples, an application running on wireless device 306 may determine whether or not a user of wireless device 306 is also an operator of vehicles 350-355. In some examples, a message may be prompted on wireless device 306 and user input may be used to indicate that the user is not an operator of one of vehicles 350-355. In some examples, a search request may be transmitted in response to a determination that one or more passengers have exited one of vehicles 350-355, based on data from one or more external sensors.

Some advantages of disclosed aspects include being able to monitor locations of vehicles and/or wireless devices and provide directions to a listing location, even when data networks may temporarily be unavailable or have limited connectivity. Some advantages may also include social sharing of parking locations, so that groups that arrive at a parking facility may be able to find parking spaces close to other group members. Some advantages of disclosed aspects may additionally include monitoring vehicles passenger occupancy status. For instance, when a wireless device user enters a parking facility, it may be determined that the wireless device has entered the parking facility in a vehicle. Based on monitoring speed, it may be determined that the vehicle in which the wireless device is present has stopped based on the location of the wireless device being within a parking space and/or based on detecting that the wireless device is stationary for a threshold period of time, e.g., 10-15 seconds. Once the wireless device user has exited the parking facility with the wireless device, it may be inferred that the vehicle is no longer occupied.

In some aspects, geographic area 304 includes a parking lot. In some examples, wireless device 306 enters geographic area 304 with vehicle 350. In some examples, a pass may be added to the first software application, such as APPLE WALLET. Once the pass is added, wireless device may be presented with an option to download a second software application, such as a parking application (e.g., PIED PARKER). In some examples, the second software application may already be installed on wireless device 306 and deliver a notification to the user prompting them to save a new pass to their device or open an existing one. In some examples, at the entrance to the parking lot there is a kiosk or other fixed device that uses a short-range wireless technology, such as NFC, BLUETOOTH low energy (BLE) and/or the like, which, when in proximity or direct contact with wireless device 306, causes wireless device 306 to prompt a pass to be applied via the first software application. In some examples, the fixed device includes an NEC reader, RFD tag reader, a facial recognition device, retina scanner, a fingerprint reader, barcode scanner, and/or the like and/or combinations thereof. In some examples, at the entrance/exit to the parking lot there are sensors, such as cameras, that may identify a vehicle and associate the vehicle with a payment profile. The vehicle may be identified visually by license plate number, vehicle identification number (VIN), by an appearance of the vehicle (such as by using machine learning as discussed below with respect to FIG. 4), and/or by one or more identifiers (e.g., an identifier that includes the license plate number or VIN of the vehicle) broadcast by a device within the vehicle, such as the stereo system projecting a MAC address, RFID chip in a license plate, auditory features such as engine noise, or identification of a driver, passenger, or other vehicle occupant such as by using facial identification, and the like.

In some aspects, a vehicle may contain a number of persons (including zero), any number of which may or may not have the parking application installed on a wireless device. In some examples, such persons may car pool such a vehicle, and at least one of such persons may have the parking application installed on a wireless device. Such wireless device may be in proximity to such a fixed device, e.g., via BLE, at such a parking lot entrance or exit. In some examples, such a wireless device may receive a notification from such a fixed device. In some examples, such a wireless device may monitor such a fixed device and trigger a notification locally (e.g., within 100-1000 meters). In some examples, such notification is received by a multiple number of persons in such vehicle. In some examples, the notification may prompt the existing user to open the parking application; the parking application may open a screen with an image of such existing user's vehicle at requesting entry at such parking lot entrance. In some examples, a vehicle can be scanned to determine which wireless devices have the parking application installed and which ones do not, and transmit notifications within the parking application to those that do, and a prompt to download the parking application to those that do not. In some examples, a person driving such vehicle does not have the parking application installed on a wireless device; however, the vehicle they are driving is associated with an existing user of the parking application. In some examples, the vehicle is driving itself and it is associated with an existing user of the parking application. In some examples, such a person may be driving such a vehicle that is not associated with an existing user, however, the person is an existing user of the parking application.

In some aspects, when an identifier is recognized, a corresponding message is prompted on the wireless device 306. In some examples, the corresponding message is a notification, alert, update, text message, chime, and/or the like, on wireless device 306. In some examples, the corresponding message presents a pass when a second software application, such as a parking application (e.g., PIED PARKER), is not installed on wireless device 306. In some examples, the corresponding message is a notification from the second software application such as the parking application installed on wireless device 306. In some examples, the corresponding message includes a request to search for a listing location. In some examples, the corresponding message includes a link. In some examples, the link is a deep link, such as a uniform resource identifier (URI) that launches a resource within a second software application. A deep link enables wireless device 306 to launch a second software application to a relevant portion within the second application without having to separately launch the second software application and navigate to that relevant portion. In some examples, the deep link is a deferred (AKA persistent) deep link, such that it routes wireless device 306 to content even if the second software application is not installed when the link is activated; via the deferred deep link, wireless device 306 is redirected to an application store, such as GOOGLE PLAY or the APP STORE, to allow for download and/or installation of the linked-to application, and then, upon completion of the download and/or installation, launches the second software application and navigates to the relevant portion.

In some aspects, a second software application, such as PIED PARKER, may already be downloaded on wireless device 306. In some examples, when the second software application is already downloaded, the second software application may generate one or more search request parameters automatically, and a search request may be generated. In some examples, only one software application is required. In some examples, search request parameters are associated with listing locations, parameters including, but not limited to, preset information or data concerning listing locations previously requested by wireless device 306, a time of entering the search request, a proximity to the physical location of wireless device 306, an availability time, temporal duration of reservation period, time remaining for availability, a type of listing location, such as whether the listing location may accommodate motorcycles, trucks, compact vehicles, and/or the like; a price range for a listing location, dimensions associated with listing locations, whether or not the listing location has an over-head cover, whether or not the listing location is an electric vehicle (EV) charging station, whether or not the listing location provides gas-filling services, a user rating associated with the listing location, such as a one to five star rating, a unique identifier associated with a parking space or parking lot, and/or the like and/or a combination thereof. In some examples, the driver's preferences may be integrated with one or more calendar APIs, such that meetings or other events with a temporal duration tied to a location may be identified. In some examples, the search request may be sent once network data is available to the driver's wireless device, and the driver subsequently completes the reservation of the parking space before returning to the parking garage. In some examples, a confirmation identifier may be sent to the driver's wireless device as a receipt, which may be shown/scanned in order to enter or exit the garage. In some aspects, opening a message containing the confirmation identifier may be sufficient to allow a user to enter and/or exit, with or without a prompt, in some aspects, preferences may be set by users to enforce a confirmation from wireless device 306.

In some aspects, parking facilities may have an express lane for vehicles with software applications such as PIED PARKER already downloaded on a device. Such lanes enable a faster parking experience, limiting the need to stop such vehicles on the way to a parking space or area, which may be reserved for certain vehicles in advance. In some examples, with respect to discussions above regarding FIG. 3, a vehicle can be recognized via license plate, VIN or stickers, e.g., RFID chip, QR code, BLE tracker. In some examples, a sticker may include a QR code that is colored to look like a logo, such as the gray and orange logo of PIED PARKER. The QR code may identify a vehicle as corresponding to a particular user, or, in some cases, multiple drivers corresponding to one vehicle. In some examples, the presence of a particular user can be recognized by the presence of a wireless device in their possession. In some examples, the vehicle and the person driving are both recognized, and are associated in a database. In some examples, such a vehicle is recognized, however, unassociated with a particular user. The user driving such vehicle may associate the vehicle with their PIED PARKER account upon arrival and authentication by an on-site, PIED PARKER software-enabled device, e.g., handheld POS, fixed kiosk or smartphone. In some examples, the vehicle is recognized and the user is recognized In some examples, authentication is performed by parking attendants using such a device on-site. In some examples, an express lane may have sensory devices installed, including but not limited to; LED strips, or speakers. In some examples, LED strips may change color to signal that a vehicle should not be in the lane.

Some advantages of disclosed aspects include completing a transaction for reserving a listing location with little to no user input. In some examples, using a wireless device, a user may complete hands-free payment of parking fees or receive parking verification. The wireless device may receive a notification once it is close to a parking facility. The notification may include pricing and hours information, which may be provided in part based on image data, and give the wireless device user the option, for instance, to simply use voice commands to trigger the parking space search request on the wireless device. Using pre-entered payment information, and information about a location, the wireless device may complete the transaction by confirming with the wireless device user whether or not to park at a location. This is a significant improvement over previous systems, which required frequent manual input. Some advantages of disclosed aspects also include reduced traffic, reduced processing time, and increased user acquisition, potentially from offering promotional rates for downloading parking application and booking a parking space through a parking application.

In some aspects, geofencing may be used to determine when wireless device 306 enters or leaves geographic area 304 by means of a predetermined virtual geographic boundary that includes geographic area 304. In some examples, geographic area 304 may be a home, office location, one or more commercial parking facilities, an area surrounding one or more parking facilities; and/or the like. In some examples, geographic area 304 is non-circular, and may be rectangular, oval, square, triangular, trapezoidal, a polygon, and/or the like and/or any other shape. In some examples, a message may be sent in response to determining wireless device 306 has entered or left geographic area 304 based on location data associated with wireless device 306.

In some examples, the virtual boundary may be dynamically adjusted based on machine learning using data associated with a mesh network, data including listing location data, such as GPS coordinates, image and/or video data, wireless device location data, wireless device location data and time, and telemetric data between wireless device 306 and one or more beacons. The mesh network may give the virtual boundary in the form of a three-dimensional coordinate system.

In some aspects, the virtual boundary data is enhanced with navigational mappings, such as the location of the entrance and exit on the boundary, the location of the parking spaces in relation to the boundary, the indoor routing within the geographic area, such as the indicated direction vehicles are meant to travel or detours, and/or the like.

In some aspects, wireless communication device 302 is a plurality of one or more devices, and the plurality of one or more devices and/or wireless device 306 are part of a mesh network. In some examples, wireless device 306 connects to one or more nodes of the mesh network, including one or more devices associated with geographic area 304. In some examples, the plurality of one or more devices may include, but are not limited to, a Wi-Fi modem, GPS, RFID, a BLUETOOTH component, which may include, smart devices, a vehicle or vehicle device, such as vehicle device 220; and/or the like; a hotspot tether, a 3G or 4G modem, an LTE modem, a parking sensor, such as object detection sensors discussed above with respect to FIG. 2, and/or the like and/or combinations thereof.

Some advantages of disclosed aspects include the ability of camera 310, either alone or in conjunction with other devices, to determine parking space features such as availability. This is a significant improvement over previous systems that were unable to determine such parking space features with the existing infrastructure. For instance, camera 310 overlooks a lot within geographic area 304. In some aspects, a vehicle 350 with wireless device 306 is searching for a listing location near geographic area 304. It may be determined wireless device 306 and/or vehicle 350 is searching for a parking space based on vehicle movements, calendar events, traffic, or proximity, including factors as described in U.S. Pat. No. 10,176,717, which is incorporated by reference in its entirety. In some examples, parking space availability may be determined by using data from one or more sources, such as parking sensors in the lot such as wireless communication device 302, camera 310, and cameras on vehicles that have entered geographic area 304, such as vehicles 350-355. It may be determined, using the various data sources, that there is a listing location within geographic area 304 that is available, such as the listing location designated by parking space identifier 315.

Some advantages of disclosed aspects include detecting if a reserved space is occupied before vehicle arrival. Using the various data sources, it may be determined that a listing location such as parking space identifier 315 is occupied by another vehicle. This is a significant improvement over systems that often required expensive or inaccurate sensors for each parking space or manual monitoring of inventory (e.g., clickers). Another request for a listing location may be initiated and a new listing location may be selected based on the same or similar parameters.

Some advantages of disclosed aspects include the increased accuracy of verifying when a wireless device has entered or departed a geographic area, and in some examples this verification may require limited use to no use of GPS or outside data networks (e.g., networks other than the mesh network). More specifically, in some parking garages, access to data networks may be limited because parking garages are often underground or are surrounded by thick walls of concrete. In some examples, the physical presence of wireless device 306 may be verified without the use of GPS or data networks.

Figure 4:
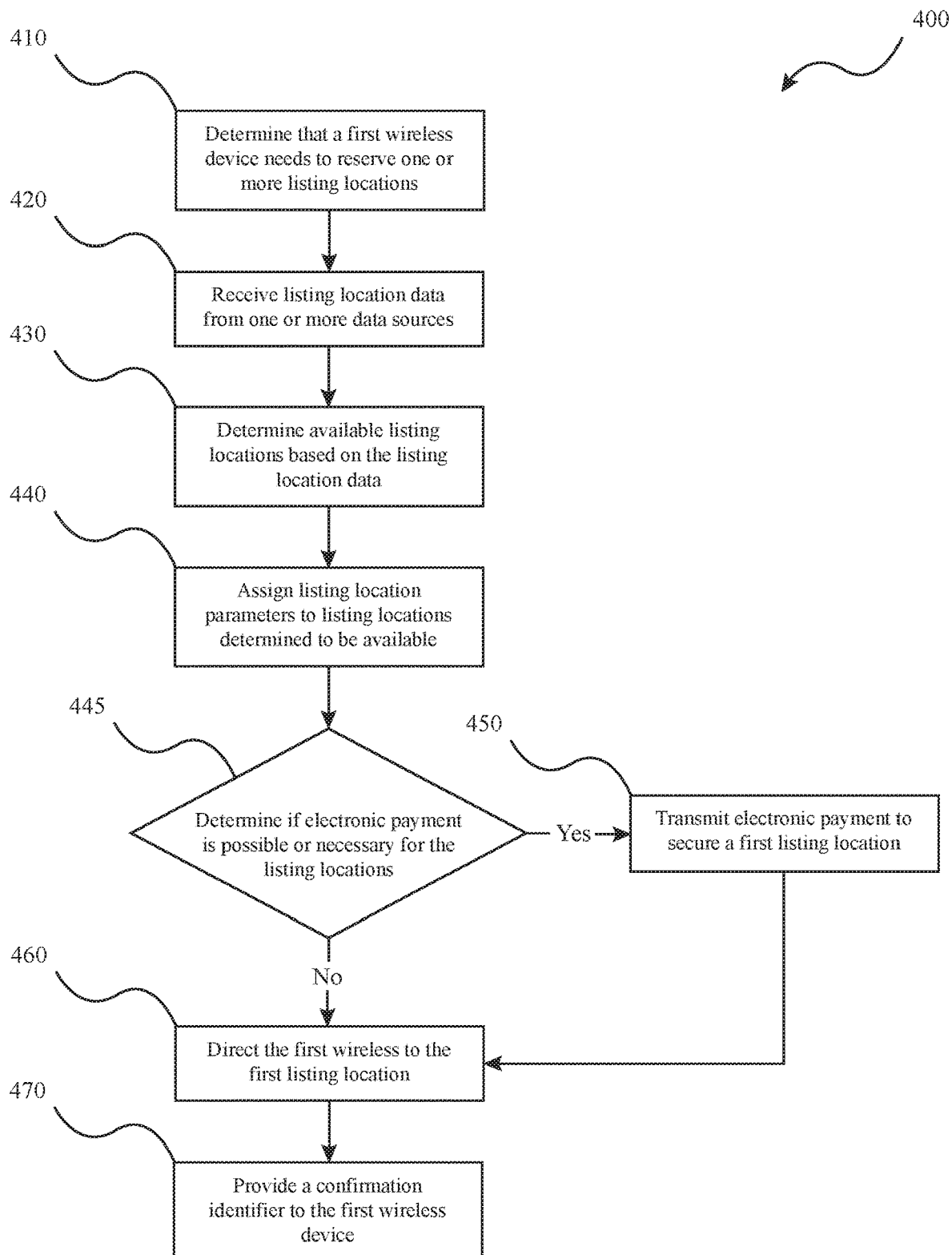
FIG. 4 is a flowchart illustrating an example method for implementing a parking identification system including identifying listing locations using multiple devices and directing a vehicle to a listing location.

FIG. 4 is a flowchart illustrating an example method 400 for implementing a parking identification system including identifying listing locations using multiple devices and directing a vehicle to a listing location. Method 400 is illustrated in FIG. 4 as a set of processes 410-450. In some examples, processes 410-450 may be implemented on one or more application servers, such as application servers 230. In some examples, not all of the illustrated processes may be performed in all aspects of method 400. Additionally, one or more processes not expressly illustrated in FIG. 4 may be included before, after, in between, or as part of processes 410-450. In some aspects, one or more processes 410-450 may be implemented, at least in part, in the form of executable code stored on non-transitory, tangible, computer readable media that, when run by one or more processors (e.g., a processor of the wireless device), may cause the one or more processors to perform one or more of processes 410-450. In some examples, the first wireless device may correspond to one or more of computing devices 110, 140, 170, wireless device 210, and/or vehicle device 220, one or more sensors may include those sensors discussed above with respect to FIG. 2, and wireless communication device 306. In some examples, the geographic area corresponds to geographic area 304. In some aspects, method 400 may be performed for a vehicle parking on a street, such as the street including vehicles 354 and 355.

During a process 410, it may be determined that a first wireless device needs to reserve one or more listing locations. In some examples, the determination may be performed by one or more application servers monitoring location data and sensor data associated with the wireless device and/or using geofencing, as discussed above with respect to FIG. 3. In some examples, the determination may be performed by the first wireless device, using methods above with respect to FIG. 3. In some examples, the determination is determined because of receiving a search request including listing location parameters. In some examples, a search request is generated, and one or more parameters are included with little or no user input. In some examples, parameters include search request parameters associated with listing locations, parameters including, but not limited to, preset information or data concerning listing locations previously requested by the first wireless device, a time of entering the search request, a proximity to the physical location of the first wireless device, an availability time, temporal duration of reservation period, a type of listing location, a price range for a listing location, dimensions associated with listing locations, whether or not the listing location has an over-bead cover, whether or not the listing location is an electric vehicle (EV) charging station, whether or not the listing location provides gas-filling services, a user rating associated with the listing location, such as a one to five star rating, an identifier associated with a parking space or parking facility, and/or the like and/or a combination thereof.

During a process 420, listing location data may be received from one or more data sources. In some examples, the data sources may include external vehicle sensors on a first vehicle, such as vehicle 250 and vehicles 350-355, crowdsourced data from other external vehicle sensors or manual reports of availability from wireless devices, sensor data from sensors installed in the ground or installed on a vantage point, data from drones or other aerial machines, ground-based machines, traffic data, parking application data, and data from wireless devices, and/or the like and/or combinations thereof. Listing location data may also be inferred by the assignment of particular parking locations to specific numbered locations, such as parking space identifier 315. In some examples, ground-based machines may include autonomous vehicles or machines such as a KNIGHT-SCOPE security robot. In some examples, the vantage point may be a part of a building or a lamp post. In some examples, parking application data may come from several parking applications.

During a process 430, available listing locations may be determined based on the listing location data. In some examples, the determination is performed by local hardware or it is captured by local hardware and then performed in the cloud, or a combination thereof. Listing location data may include information about available listing locations currently unoccupied by vehicles, or data from which it may be determined from multiple data sources. The data sources may include image data sources, such as images sent from cameras on one or more vehicles, cameras placed in a vantage point, and/or the like. In some examples, external vehicle sensor data from multiple vehicles may be used to identify unoccupied listing locations in real time.

In some aspects, sensor data may be used to determine occupied versus unoccupied listing locations. In some examples, a machine learning (MO model may be trained/tuned based on training data collected from positive recognition, false recognition, and/or other criteria. In some aspects, the ML model may be a deep neural network, Bayesian network, and/or the like and/or combinations thereof. Although various types of ML models may be deployed to refine some aspects for identifying whether a listing location is occupied or not, in some aspects, one or more ML-based classification algorithms may be used. Such classifiers may include but are not limited to: MobileNet object detector, a Multinomial Naive Bayes classifier, a Bernoulli Naive Bayes classifier, a Perceptron classifier, a Stochastic Gradient Descent (SGD) Classifier, and/or a Passive Aggressive Classifier, and/or the like. Additionally, the ML models may be configured to perform various types of regression, for example, using one or more various regression algorithms, including but not limited to: Stochastic Gradient Descent Regression, and/or Passive Aggressive Regression, etc.

In some examples, a virtual boundary including geographic area 304 may be dynamically adjusted using systems and methods described in U.S. Pat. No. 9,349,104, which is incorporated by reference in its entirety.

In some aspects, the training engine of the ML model may include a scenario module, including an arrangement of vehicles parked in various listing locations. Such scenarios may manually or receive human inputs specifying features including parked vehicles, parking lot lines, and other features within listing locations. In some examples, a neural network may be trained for a given ML model using backpropagation.

In some aspects, an ML model neural network includes neural network modules that comprise feed-forward computation graphs with input nodes, hidden layers, and output nodes. In some examples, for classifications that involve images, pixel-values of an input image forming part of a classification may be assigned to input nodes. Such input nodes may be fed through the network and pass a number of non-linear transformations. In some examples, once the input nodes are fed forward, the output node may yield a value that corresponds to the class inferred by the neural network.

In some aspects, once an ML model is trained, the ML model may receive one or more inputs, e.g., one or more images captured by external sensors or cropped portions of one or more images captured by one or more sensors, and classify those inputs as having a particular numeric affinity for each class for which the network was trained. In some examples, a ML model may be specific to a particular listing location or group of listing locations, such as a parking lot. In some examples, the ML model may be specific to a parking lot at specific times, such as a busy grocery lot during the weekend. In some examples, a ML model may be trained to identify certain features of vehicles, such as, identify certain aspects of the vehicle such as the make, model, year, color, shape, and if any, customizations, damage and plates. Some advantages of disclosed embodiments include, identification of vehicles even when a license plate cannot be recognized.

In some aspects, a vehicle may enter a parking lot such as the parking lot discussed above with respect to FIG. 3. Such a vehicle may be recorded by one or more cameras and/or microphones, from multiple angles and at multiple points in time; capturing numerous features of the vehicle prior to entering, including both visual and auditory characteristics. A subset of the numerous features, such as the make, model, and year, may be used to construct a partial Vehicle Identification Number (VIN). When a vehicle enters the lot, the partial VIN and other features, such as plates, decals, damage, engine-noise, and vehicle customizations, such as spoilers, after-market additions, and the like may be collected then persisted to a database that is, for example, located on-premise. Recordings of the vehicle once entered may be collected and persisted, then distinctly mapped to a vehicle persisted in the database, and to the associated user thereof, e.g., based on a scoring system that shows the likelihood that a vehicle shares the same features of a particular vehicle that has been recorded entering the lot. In some aspects, the partial identification of a vehicle may be combined with the identification of a user associated with the vehicle, e.g. BLE, NFC or RFID may be used to detect the proximity of a user inside their vehicle.

In some aspects, an ML model may be trained on visual and auditory data, e.g., historic footage recorded by vehicle 'dash cams' from which the video and audio is processed with historic parking data, traffic data, sounds of a vehicle with its engine running coupled with the visual aspects of the vehicle.

In some aspects, an ML model may be trained to identify particular listing locations and features of the listing locations or objects of interest, such as parking lines, arrows, numbers, meters and associated information (e.g., meter number), parking signs, parking floors, coloring, characters, parking restriction indicators (e.g., no-parking signs, signs limiting parking hours, fire hydrants, handicap parking signs, etc.), curbs, side strips, objects such as pedestrians and cyclists, various types of vehicles, trees, roads, terrain, motor vehicles, overstaying vehicles, badly parked vehicles, blacklisted vehicles, abandoned vehicles, license plates, bridge abutments, construction zones, cones, road margins, traffic signs, license plates, street signals and/or the like. In some examples, one or more pre-trained models may be incorporated and made a part of an ensemble of models.

In some aspects, an ML model may be trained in a virtual environment. In some examples, training in a virtual environment can enhance a model's focus through reinforcement learning, on certain visual data or scenarios, which may occur infrequently. This enables the ML model to account for edge cases (that may be based on real scenarios) that an ML model with less training may perform inaccurately when encountering the same or a similar scenario to such edge cases. In some examples, a virtual environment may be a 3D model of an environment within which batches of random simulations are performed. In some examples, the training may be performed by one or many persons via augmented reality.

In some examples, an ML model ensemble of neural networks may apply one or more threshold comparisons or tests to determine whether any particular classification is sufficiently dispositive so as to be acted or relied upon (e.g., whether the classification is sufficiently dispositive such that occupancy may be determined). In some examples, a neural network module may test a classification to see if the separation between a top score and all other scores meets or satisfies a certain separation threshold. A neural network may be trained to recognize (e.g., produce affinity scores for) a certain, predetermined set of classes. The number of classes within such a set may vary between ensembles.

In some aspects, the number of classes may be one greater than the types of parking lot configurations a corresponding vehicle is likely to encounter. In some examples, if a neural network were only concerned with arrows and a corresponding vehicle were only likely to encounter four types of arrows, the number of classes may be five and include a not-an-arrow class, a left-to-right-arrow class, a right-to-left-arrow class, a front-to-back-arrow class, and a back-to-front-arrow class. In some examples, a neural network may be trained to recognize more than just arrows or parking configurations (e.g., locations and/or orientations of parked vehicles, locations, orientations of lines, and/or the like and/or combinations thereof) other than arrows. In some examples, a neural network may be trained to recognize one-way lanes of various configurations including: feeder lanes that extend from a thoroughfare to various directions of travel and angles 0 to 360 degrees.

In some aspects, method 400 may include gathering probabilistic info using the image data and other data, e.g., traffic data and historical data to listing locations being available. In some examples, listing locations are selected for one or more vehicles searching for parking such that traffic is reduced and a time to parking for each vehicle is reduced or minimized. In some examples, notifications may be sent to parking providers based on availability of parking locations within an area being low, e.g., parking availability being below 10 percent to current capacity. In some examples, a pricing model may be used to calculate a recommended cost for a listing location, based on surrounding location data and historical information of payments.

In some aspects, video storage may filter for relevant portions of video based on one or more detected objects of interest.

Some advantages of disclosed aspects include greater accuracy by being able to detect occupied and unoccupied parking spaces. This allows for more efficient use of a parking lot's resources and for increase in revenue. Vehicle operators and vehicles will have to spend less time looking for parking because availability of parking spaces is updated in real time. Prediction algorithms may also be improved, with more data about real-time availability, prediction systems are able to detect more subtle variances that self-reporting would otherwise not account for.

During a process 440, listing locations determined to be available during process 430 may be assigned listing location parameters. In some examples, listing location parameters include whether the listing location is free or the price for parking a vehicle, whether the location is associated with a particular parking space and the parking space has an assigned value within a database. In some examples, it may be determined whether a listing location is associated with a meter and the meter has an assigned value within a database. In some examples, in process 440 it is determined whether listing locations are associated with a particular parking facility or organization, or are managed by a particular organization or application.

During a process 445, it is determined whether electronic payment is possible or necessary for the listing location. In some examples, when it is determined electronic payment is not possible or is unnecessary for the listing location (e.g., parking is free), then the method proceeds to process 460. In some examples, determination may be derived from existing parking location data and through real-time recognition of parking information signs and other image data. In some examples, a metered listing location may belong to a city and it may be determined whether online or telephonic payment for the metered listing location is possible. If no payment is possible, an alert may be generated that the location requires manual payment or other verification. If a listing location belongs to a private facility, payment online or telephonically may be possible. In some examples, payment may be through a link or QR code posted on a parking sign. In some examples, other APIs may be integrated to facilitate payment, e.g., with PIED PARKER and payment for a particular meter in a city. Availability may also be cross referenced with any restrictions that may be more permanent (e.g., posted signs regarding weekly street sweeping) and restrictions that may be more temporary (e.g., construction signs that block out parking for periods of time, such as during certain hours or dates, and/or signs that block out parking for events). Basically if any of the desired reservation time occurs during a restricted time, then either the reservation may be cancelled or cut short, depending on preferences.

During a process 450, electronic payment is transmitted for the securing of a first listing location. Electronic payment may be completed using stored payment information. In some examples, payment may be made through an API and use identifying information such as a telephone number. In some examples, a text message containing a vehicle's identification information, for example, a Vehicle Identification Number (VIN) or License Plate Number (LPN), is sent to a mobile number that identifies a parking space or collection thereof. In some examples, an AI system may be used to respond to such telephonic requests with vehicle information, payment method settings, parking profile preferences and parking space ID numbers. In some examples, electronic payment may include manual input of payment information via a first software application. In some examples, a telephone call may be initiated and may be programmed to respond to the requests for information, such as telephone number and credit card information, using numeric telephone inputs or using a computerized voice. The telephone call may respond to automated telephone systems or to converse with a parking provider on the phone, such as using GOOGLE ASSISTANT.

In some aspects, transmission of payment information for electronic payment may be delayed. In some examples, payment may be transmitted once wireless device has access to a network, in a designated area, or may be rerouted by other devices, such as wireless communication device 302. In some examples, attempts to transmit may occur periodically or once network is detected again. In some examples, payment for the maximum duration allowed is initiated and then when the network is detected again, it could cancel and prorate that amount to only pay for the time actually parked. In some examples, the system could track when the operator parks his vehicle and then make a payment when data connectivity is restored and stop when a user is back in their vehicle and transmitting data.

During a process 460, directions to the first listing location are provided to the first wireless device. Parking of a vehicle may be performed autonomously or semi-autonomously as discussed above with respect to FIG. 2. In some examples, the listing location may not be marked by physical lines, but may be completely determined by virtual boundaries. In some aspects, parking arrangement for a plurality of vehicles may be predetermined or dynamic. An arrangement may include a smart arrangement so as to increase the number of cars able to park within a parking lot.

During a process 470, a confirmation identifier may be transmitted to the first wireless device. In some examples, the confirmation identifier is transmitted from one or more application servers. In some examples, a confirmation identifier includes a coded image, such as a barcode, a pass key, a password comprised of alphanumeric characters, an encrypted signal or key, and/or the like and/or a combination thereof. In some examples, the confirmation identifier prompts the first wireless device to transmit a signal, such as methods discussed above with respect to FIG. 3. In some examples, the confirmation identifier may be manually displayed to a toll booth operator. In some examples, a toll booth operator may use a scanner to scan a coded image displayed on the first wireless device including the confirmation identifier. The confirmation identifier may be transmitted by the wireless device, the confirmation identifier causing a secured area to become unlocked. In some examples, the secured area may be a locked box or locker, such as an AMAZON LOCKER, an access control mechanism, a lock to a vehicle or non-motor-powered means of transportation, and/or the like and/or a combination thereof. In some examples, an access control mechanism may be a gate, a gate arm, and/or the like; at the entrances and exits of a parking facility. In some aspects, the aforementioned secure areas are or have mechanisms that can be securely operated without additional hardware. In some aspects, to control access, the mechanisms are bypassed with a relay module and/or alike. In some examples, the relay module is capable of a wireless connection, and/or additional hardware enables the wireless connections required.

In some aspects, the confirmation identifier may unlock a secured area for storing the vehicle unlocking mechanism, such as a valet key box. In some examples, the valet will have access to the keys to be able to move the vehicle if necessary. In some examples, one or more of vehicle, access control mechanism, and/or lockers include an NFC reader, RFID tag reader, a facial recognition device, retina scanner, a fingerprint reader, barcode scanner, and/or the like and/or combinations thereof.

Some advantages of disclosed aspects include real time identification of listing location availability and automatic booking, increasing efficiency and use of parking lots, minimizing accidents, reducing park and drive time, reducing traffic, less accidents, simplification of user experience, increasing revenue, reducing carbon emissions, and faster processing of transactions. In some examples, a wireless device user requests a parking space for a vehicle. The wireless device user may include preferences in the request for parking spaces suitable for the user's preferences and the vehicle. Available parking spaces may be determined using multiple sources, such as overhead camera images, parking sensors, and visual data from other vehicles close to the area the wireless device user wishes to park. Once available parking spaces are determined, these parking spaces may be associated with a particular parking vendor or application, such as PARK MOBILE. Using the information about the parking spaces, it may be determined whether payment for one or more parking spaces is necessary, i.e., it is free, or, if it is necessary, if payment is possible, such as whether a meter will take payment over the phone or whether a particular parking vendor will take electronic payment. It may be determined whether parking, is free by cross referencing available parking spaces with information about the parking spaces in a database. If electronic payment is possible and necessary, payment may be done over the phone or using an integrated app. This is a significant improvement over previous systems, because facilitating electronic payment for a parking space allows for the operator to avoid having to complete the transaction while at the parking facility gate or while driving and looking for a parking space; the operation may simply be completed using a wireless device application or other wireless device. By way of another example, a vehicle may have a known destination inputted in a navigation software application, a calendar entry, other passes stored in the wallet, based on location history, entering a geofenced area, etc. In some examples, when looking for a listing location based on information included in a calendar entry or a particular destination, and not in proximity to destination, databases may be used to gather information on availability, proximity, cost, and/or the like. In some examples, a calendar entry may correspond with a flight departure, and a search request for a parking facility in proximity with the corresponding airport may be processed in accordance with disclosed methods. In some examples, a search request may be processed as described in U.S. Pat. No. 10,176,717, which is incorporated by reference in its entirety. This is a significant improvement over previous systems that may have required manual input of all or nearly all relevant information in order to complete a parking transaction for a particular location.

Figure 5:
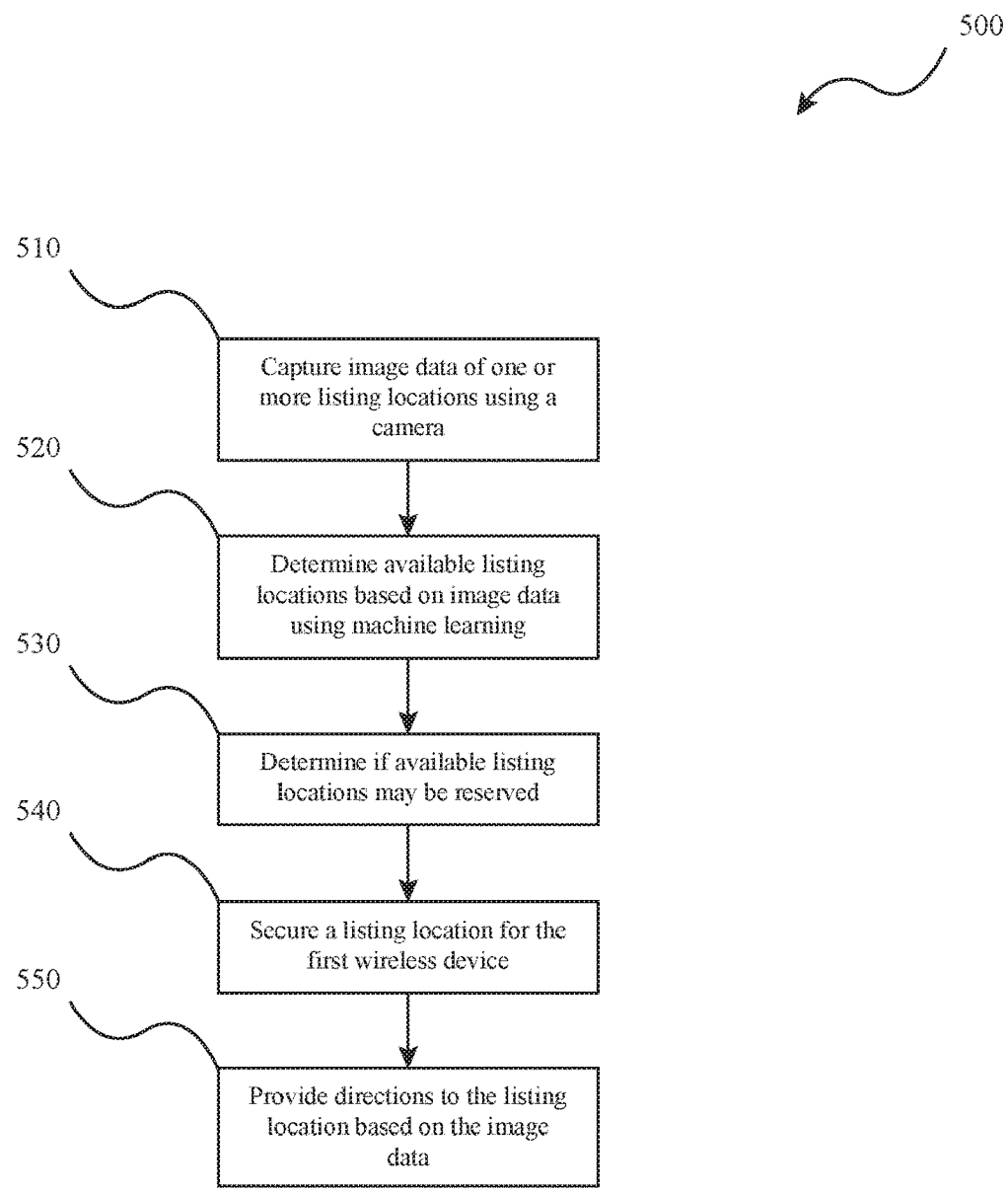
FIG. 5 is a flowchart illustrating an example method for implementing a parking identification system including identifying available listing locations using machine learning and image data and securing a listing location for a vehicle.

FIG. 5 is a flowchart illustrating an example method 500 for implementing a parking identification system including identifying available listing locations using machine learning and image data and securing a listing location for a vehicle. Method 500 is illustrated in FIG. 5 as a set of processes 510-570. In some examples, processes 510-570 may be implemented on one or more application servers, such as application servers 230. In some examples, not all of the illustrated processes may be performed in all aspects of method 500. Additionally, one or more processes not expressly illustrated in FIG. 5 may be included before, after, in between, or as part of processes 510-570. In some aspects, one or more processes 510-570 may be implemented, at least in part, in the form of executable code stored on non-transitory, tangible, computer readable media that when run by one or more processors (e.g., a processor of the wireless device) may cause the one or more processors to perform one or more of processes 510-570.

In some examples, the first wireless device may correspond to one or more of computing devices 110, 140, 170, wireless device 210, and/or vehicle device 220, one or more sensors may include those sensors discussed above with respect to FIG. 2, and wireless device 306. In some examples, the geographic area corresponds to geographic area 304.

During a process 510, image data of one or more listing locations is captured using at least one camera. Image data may be captured as discussed above with respect to FIG. 3. The image data may include portions of one or more listing locations.

During a process 520, available listing locations are determined based on image data using machine learning. Image data may be processed using machine learning as discussed above with respect to FIGS. 3-4.

During a process 530, it is determined if the available listing locations may be reserved. In some examples, process 530 corresponds to process 430.

During a process 540, a listing location may be secured for the first wireless device. The listing location may be secured in response to a search request, such as described above with respect to FIGS. 3-4. In some examples, a database of locations is updated in response to securing the listing location and parameters regarding the listing location, such as availability.

In some examples, a calendar event is updated for the calendar belonging to a respective user of the first user device, including information such as a time for which the listing location is reserved and an address and/or coordinates corresponding to the listing location. In response to securing the listing location, the first wireless device receives a signal within the geographic area, the signal including an identifier. In some examples, the signal is transmitted by a wireless communication device, and the identifier is associated with the first wireless device. In some examples, the wireless communication device may correspond to wireless communication device 302.

During a process 550, directions to the listing location may be provided based on the image data. Upon arrival at an entrance to the listing location, the identifier may be used to unlock a secured area. The identifier may include license plate information, or other vehicle identifying information. In some examples, the confirmation identifier may correspond to the confirmation identifier discussed above with respect to FIG. 4. Some advantages of disclosed aspects include avoiding the use of printing vouchers, tickets, or parking facility personnel. The voucher may be stored on the phone and presented when verifying payment, such as when the vehicle operator is at an exit of a parking facility. Some advantages of disclosed aspects include reducing the need for paper or man-hours, verifying payment hands-free, and diminishing or eliminating the need for actual user input.

Figure 6:
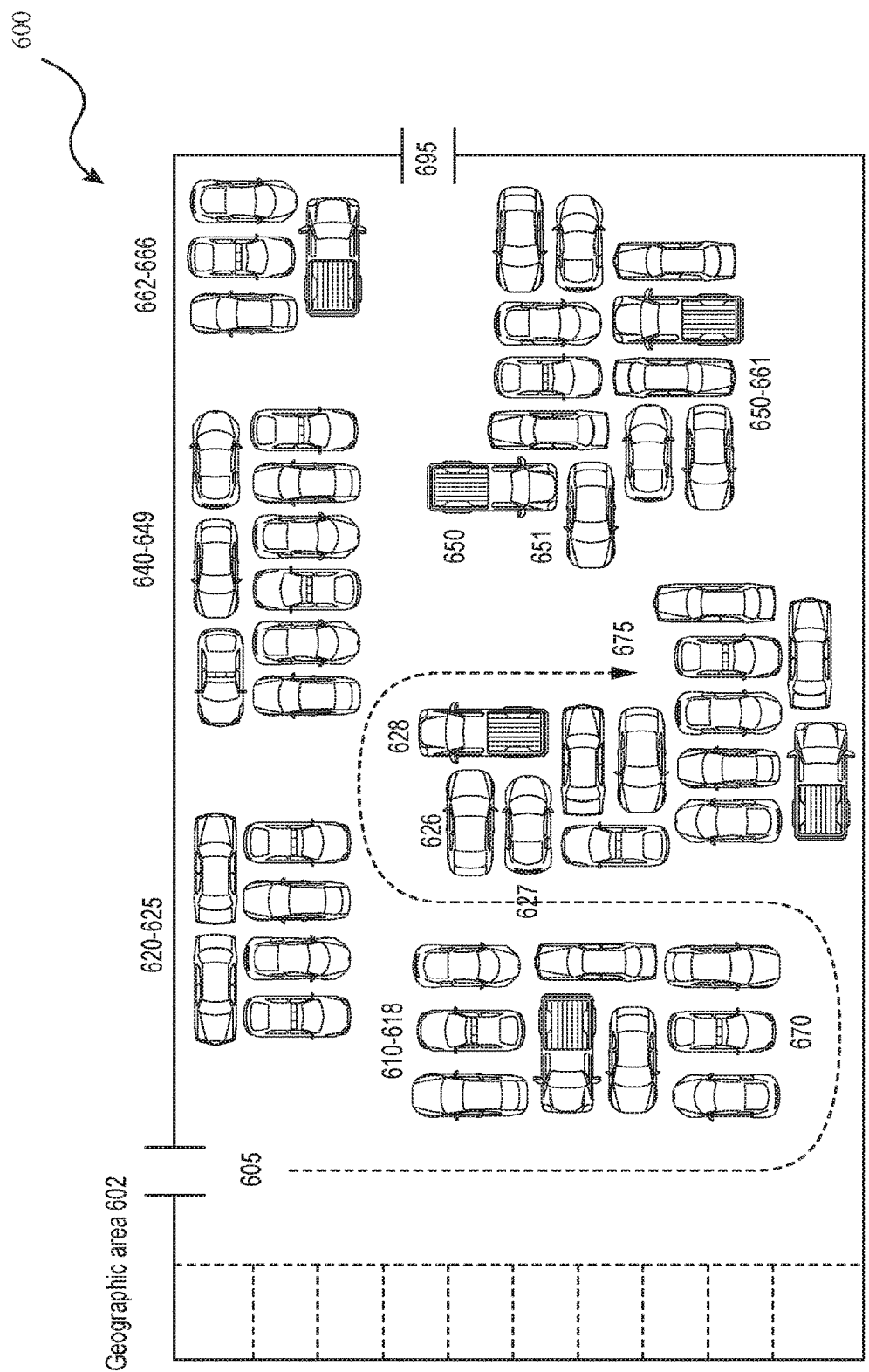
FIG. 6 is an example system for parking within a geographic area including dynamically assigned listing locations according to some aspects.

FIG. 6 is an example system 600 for parking within a geographic area including dynamically assigned listing locations. FIG. 6 shows the floor plan of a parking structure showing vehicles 610-618, 620-625, 626-638, 640-649, 650-661, and 662-665 parked within geographic area 602. In some examples, listing locations may correspond with listing locations discussed above with respect to FIGS. 3-5. In some examples, geographic area 602 may correspond with geographic area 304. In some examples, parking spaces may be vehicular carousels and may be accessed using lifts. In some aspects, a vehicle travels along the path from entrance 605 to listing location 675 through listing location 670. In some examples, the vehicle includes at least one wireless device, that may correspond to one or more of computing devices 110, 140, 170, wireless device 210, vehicle device 220 or wireless device 306. In some examples, the vehicle corresponds with vehicle 250 or vehicle 350. In some examples, the wireless device may enter geographic area 602.

In some aspects, using a mesh network, such as the mesh network discussed above with respect to FIG. 3, location data associated with the wireless device and/or the vehicle entering geographic area 600 may be monitored. In some examples, location of the wireless device may be derived using collective telemetric data of the beacons in the mesh network, including telemetric data between the wireless device and one or more beacons and location data of the one or more beacons. In some examples, the wireless device may receive and analyze high frequency, low-power electromagnetic radiation from multiple locations to triangulate a relative 3-D position and orientation within geographic area 602. In some examples, the triangulation may be performed on one of the one or more wireless communication devices in proximity and communication with the wireless device. In some examples, trilateration may be used to devise the coordinates of the wireless device. In some examples, each of the beacon's coordinates may be determined using ultra-wide band (UWB), based on a time taken for each beacon to send a signal to another beacon. From this data, a map of beacons and their locations may be determined with respect to one another.

In some examples, a vehicle departs from listing location 675 to exit 695.

Figure 7:
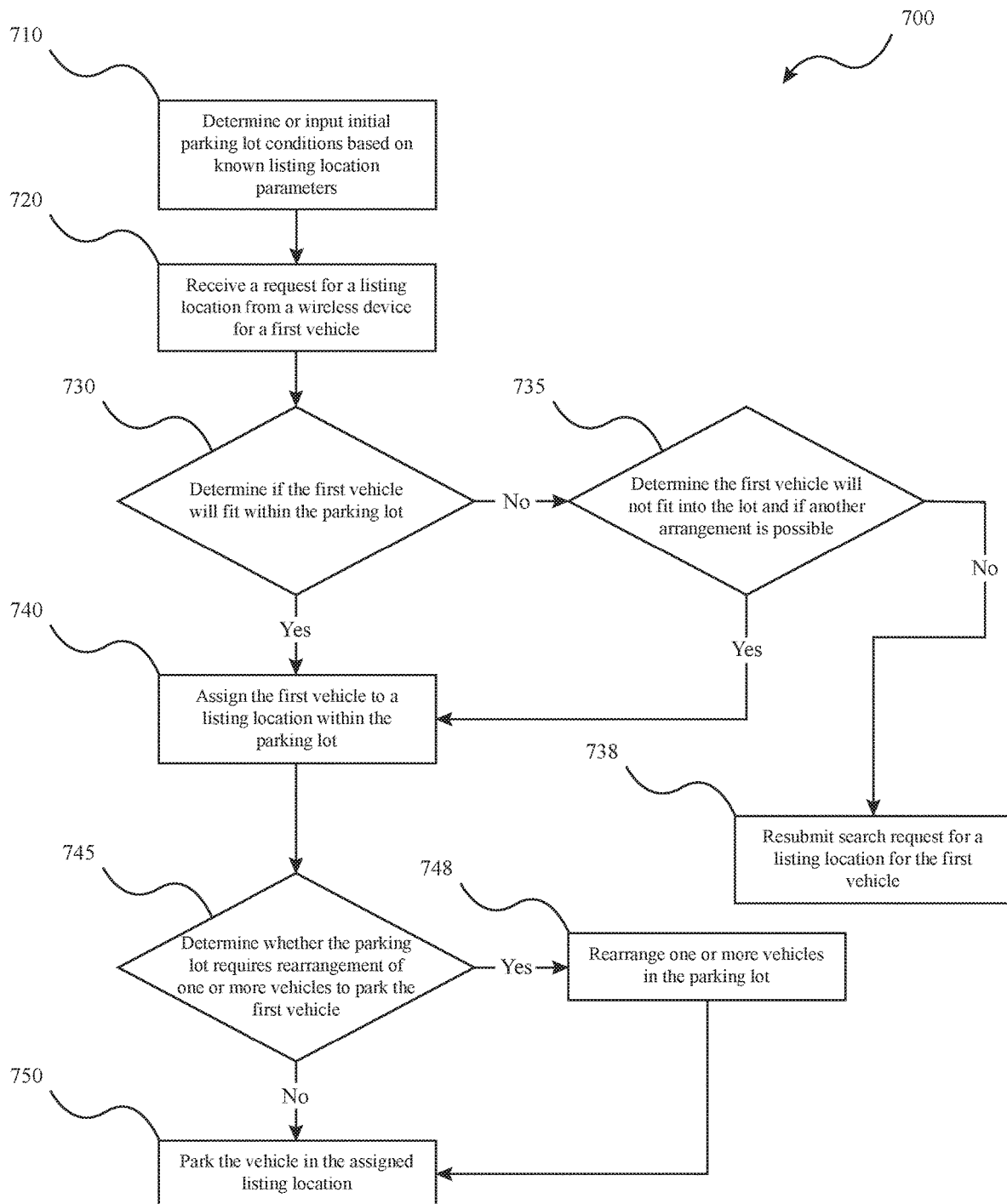
FIG. 7 is a flowchart illustrating an example method for dynamic arrangement of vehicles within a parking lot.

In some aspects, the vehicle may be parked in accordance with the method of FIG. 7. In some aspects, the vehicle may depart in accordance with the method of FIG. 8.

FIG. 7 is a flowchart illustrating an example method 700 for dynamic arrangement of vehicles within a parking lot. Method 700 is illustrated in FIG. 7 as a set of processes 710-750. In some examples, processes 710-750 may be implemented on one or more application servers, such as application servers 230. In some examples, not all of the illustrated processes may be performed in all aspects of method 700. In some aspects, one or more processes 710-750 may be implemented, at least in part, in the form of executable code stored on non-transitory, tangible, computer readable media that when run by one or more processors (e.g., a processor of the device) may cause the one or more processors to perform one or more of processes 710-750.

In some aspects, a listing location is within a partially or entirely automated parking facility, such as the parking lot within geographic area 304 and geographic 602 where vehicles may be instructed to move remotely. Listing locations may be entirely dynamic and/or defined by virtual boundaries. In some examples, a vehicle may be assigned the parking space once proximate to the parking facility (e.g., within 100-1000 meters). In some examples, the virtual boundaries may be based on vehicle length and width where the length and width may be known based on a make and model of a vehicle. Vehicles may grant temporary authority to an automatic system or valet to move vehicles within a parking facility.

During a process 710, initial parking lot conditions are determined and/or inputted based on known listing location parameters. In some examples, the parking lot is empty, and all that is initialized is the area of the parking lot. In some examples, there are one or more vehicles parked in the parking lot. In some examples, specific contours of a parking lot, e.g., an indoor garage, are mapped out using external sensors of vehicles and/or cameras within a parking lot. In some examples, sensors may includes sensors described above with respect to FIG. 3. In some aspects, a vehicle enters geographic area, such as geographic area 602, and vehicles 610-618, 620-625, 626-638, 640-649, 650-661, and 662-665 are parked as illustrated in FIG. 6.

During a process 720, a request for a listing location is received for a first vehicle from a wireless device. In some examples, the vehicle includes at least one wireless device, that may correspond to one or more of computing devices 110, 140, 170, wireless device 210, vehicle device 220, or wireless device 306. In some examples, the first vehicle corresponds with vehicle 250 or vehicle 350. In some examples, the request is sent from a wireless device or a vehicle device. In some examples, the request may be received by one or more application servers. In some examples, the first request includes information about the first vehicle and information about the needed listing location. In some examples, the length and width of the vehicle are included in the information or information such as the license plate number or YEN may be used to determine the length and width of the vehicle. In some examples, information about the length and width of the vehicle may be determined at an entrance to the parking lot, such as by cameras using a known distance or depth maps. In some examples, the length and width account for a buffer in order to avoid for risk of collision. In some examples, the information about the needed listing location may include what time is needed for arrival and departure. In some examples, arrival time may be determined based on a location or navigation information such as described above with respect to FIG. 3.

During a process 730, it is determined whether the first vehicle will fit within the parking lot. In some aspects, this merely involves a counter of available parking spaces of a given type and whether the number of occupied or reserved spots is less than the number of total parking spaces. In some aspects, determining whether the first vehicle will fit is based on a two-dimensional analysis of whether a car will fit within a parking configuration. In some examples, a parking configuration may be completely or only partially defined by physical boundaries. In some examples, a parking lot ma be organized in a configuration that is defined only by virtual boundaries so as to maximize the use of space within the lot. In some examples, the determination includes factoring time, and when other vehicles that are currently parked are leaving. In some examples, a buffer time is provided so that a vehicle that is boxed in must be leaving at least one hour after the first vehicle is scheduled to.

In some aspects, whether the first vehicle will fit is determined based on trial cases. In some examples, the first vehicles parameters are used to determine if the vehicle will fit into a listing location with virtual parameters, such as in listing location 675. This determination may include whether the first vehicle can turn through listing location 670 to maneuver to listing location 675 without hitting any other vehicles. It may be determined that one or more cars may need to be rearranged, such as moving truck 628 forward.

In some aspects, the determination may be made empirically based on vehicle measurements. Such measurements may be made by vehicle sensors such as described above with respect to FIG. 3 or other measurement devices.

During a process 735, after it is determined that the first vehicle will not fit within the parking lot, and then it is determined if another arrangement is possible. In some examples, a threshold number of moves (e.g., moving 3-10 cars) and time (e.g., 3-8 minutes) is used to determine whether an arrangement is possible. In some examples, it is determined how vehicles are rearranged with the fewest amount of moves in the lowest amount of time. In some examples, one or more listing locations are attempted to be assigned to the first vehicle. In some examples, the first vehicle must fit in a spot where it can get out in time for scheduled departure. In some examples, factors affecting moves may include a turning radius of a vehicle, as determined by the specs of the vehicle or based on observation of the vehicle (e.g., by a camera). In some aspects, with respect to a vehicle entering geographic area 602, the first vehicle, in order to fit into listing location 675, may need vehicles 626-627 and truck 628 to move in order to complete maneuvering into listing location 675 without collision. Truck 628 would pull forward and vehicles 626 and 627 moved forward slightly to allow for the first vehicle to make the turn.

During a process 738, if no other arrangement is possible, then the request for a listing location for the first vehicle may be resubmitted or the first vehicle may be assigned to another parking lot. If no listing location is available in the parking lot, data may be sent in order to generate a new search request for a different parking lot. In some examples, the data sent from the device includes location data; the one or more application servers searches a database of listing locations and determines closest listing locations. In some examples, the data sent from the second device includes pricing information, location data, and destination data; the one or more application servers searches a database of listing locations and finds the cheapest listing locations proximate to the location and/or destination of the second device. In some examples, a device is proximate when the distance is less than a threshold number of miles, such as less than 0.25-5 miles.

During a process 740, the first vehicle is assigned to a listing location within the parking lot. In some examples, the listing location is defined by virtual boundaries and/or may be defined in part or completely by physical boundary.

During a process 745, if rearrangement is required, then the method proceeds to process 748. If rearrangement is not required, the method proceeds to process 750.

During a process 748, if rearrangement of one or more vehicles within the parking lot is required, then one or more vehicles in the parking lot are rearranged to allow for the first vehicle to be able to be parked. Vehicles may moved autonomously as discussed above with respect to FIGS. 2-4.

During a process 750, the first vehicle is parked in the assigned listing location. In some aspects, using the location data of the first vehicle and/or the wireless device, and/or one or more beacons, a first software application may be used to provide instructions to wireless device and/or vehicle to the assigned listing location.

In some aspects, method 700 may use machine learning and/or certain user preferences to improve the algorithm and reduce the number of moves needed for vehicles, the amount of vehicles able to be fitted into a lot, and/or the like. In some examples, preferences may include not blocking in certain vehicles, avoiding penalties for early departure, proximity to an entrance/exit.

Some advantages of disclosed aspects may include increased capacity fora parking lot, reduced traffic, reduced accidents, diminishing or eliminating the need for vehicle operator input, eliminating the need for parking attendants or valet, and faster processing of parking transactions. In some examples, a vehicle may request a parking space within a parking lot that is dynamically arranged for parking of the vehicles. Using processes described above, the vehicle may be guided to the parking space and one or more other vehicles may be moved in order to accommodate the vehicle. In some examples, the dynamic configuration and rearrangement of the vehicles is completely automated, eliminating the need for human valet and reducing concomitant human error.

Figure 8:
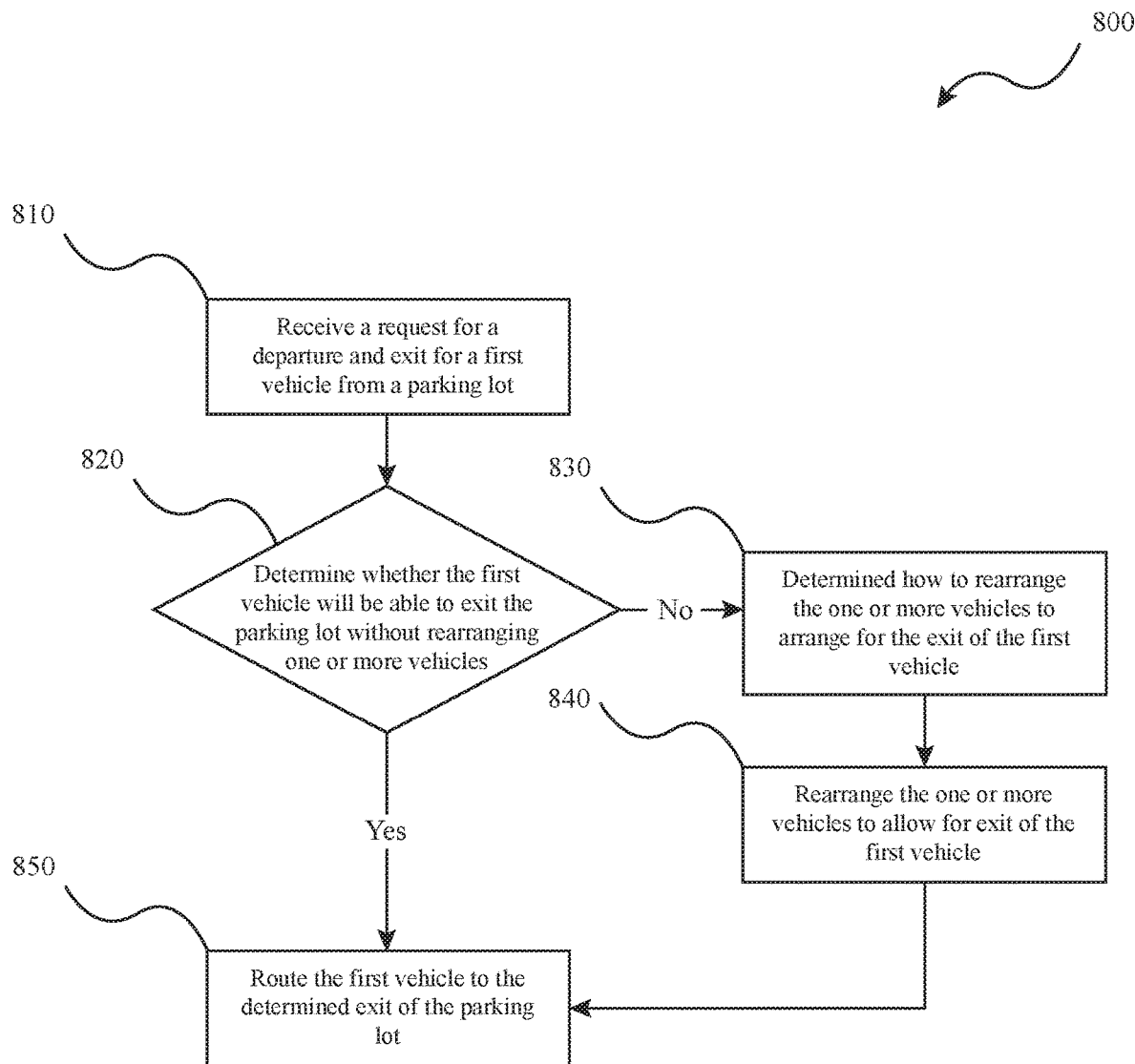
FIG. 8 is a flowchart illustrating an example method for arrangement of vehicles within a parking lot for departure of a vehicle.

FIG. 8 is a flowchart illustrating an example method 800 for arrangement of vehicles within a parking lot for departure of a vehicle. Method 800 is illustrated in FIG. 8 as a set of processes 810-850. In some examples, processes 810-850 may be implemented on one or more application servers, such as application servers 230. In some examples, not all of the illustrated processes may be performed in all aspects of method 800. Additionally, one or more processes not expressly illustrated in FIG. 7 may be included before, after, in between, or as part of processes 810-850. In some aspects, one or more processes 810-850 may be implemented, at least in part, in the form of executable code stored on non-transitory, tangible, computer readable media that when run by one or more processors (e.g., a processor of the device) may cause the one or more processors to perform one or more of processes 810-850.

In some aspects, one or more vehicles are parked in a partially or entirely automated parking lot, such as the parking lot within geographic area 304 and geographic 602 where vehicles may be instructed to move remotely. Multiple vehicles may be stored in vehicular carousels. Listing locations may be entirely dynamic and defined by virtual boundaries. In some examples, the virtual boundaries may be based on vehicle length and width where the length and width may be known based on a make and model of a vehicle. Vehicles may grant temporary authority to an automatic system or valet to move vehicles within a parking lot.

During a process 810, a first vehicle requests a departure from a parking lot. A request may be received from a wireless device, such as wireless device 210, vehicle device 220, and wireless device 306. Departure may be scheduled or unscheduled. If for instance the time is early, the vehicles may need to be rearranged. Vehicles without a departure time are seen as high risk in regards to the potential of sudden departure, and thus are parked and charged a premium accordingly. In some aspects, a vehicle is parked in a geographic area, such as geographic area 602, and vehicles 610-618, 620-625, 626-638, 640-649, 650-661, and 662-665 are parked as illustrated in FIG. 6. A vehicle is parked in listing location 675.

During a process 820, it is determined whether or not the first vehicle will be able to exit the parking lot without rearrangement of one or more vehicles in the parking lot. In some examples, the second vehicle is able to depart without rearrangement based on a calculation of the movement to one or more exists without risk collision as described above with respect to FIG. 7. In some examples, it is determined no rearrangement of one or more vehicles in the parking lot is necessary, the method proceeds to process 850. In some examples, a route is determined to move the second vehicle to exit 695.

During a process 830, when it is determined the second vehicle will not be able to exit the parking lot without rearrangement of one or more vehicles in the parking lot, it is determined how to rearrange the one or more vehicles to arrange for exit. In some examples, it is determined how vehicles are rearranged with the fewest amount of moves in the lowest amount of time. In some examples, one or more listing locations are attempted to be reassigned to other vehicles. In some examples, factors affecting moves may include a turning radius of a vehicle, as determined by the specs of the vehicle or based on observation of the vehicle (e.g., by a camera). In some aspects, with respect to a vehicle exiting geographic area 602, the second vehicle, in order to traverse to exit 695, may need truck 650 to move in order to complete maneuvering without risk of collision (e.g., accounting for a buffer, as described above). Truck 628 would pull forward and vehicles 626 and 627 moved forward slightly to allow for the first vehicle to make the turn.

During a process 840, the one or more vehicles are rearranged to allow for exit of the second vehicle. The rearrangement may include moving the second vehicle. In some examples, a vehicle is parked in listing location 675 and must move forward to allow vehicle 651 to move to the left.

During a process 850, the second vehicle is routed to an exit of the parking lot.

Figure 9:
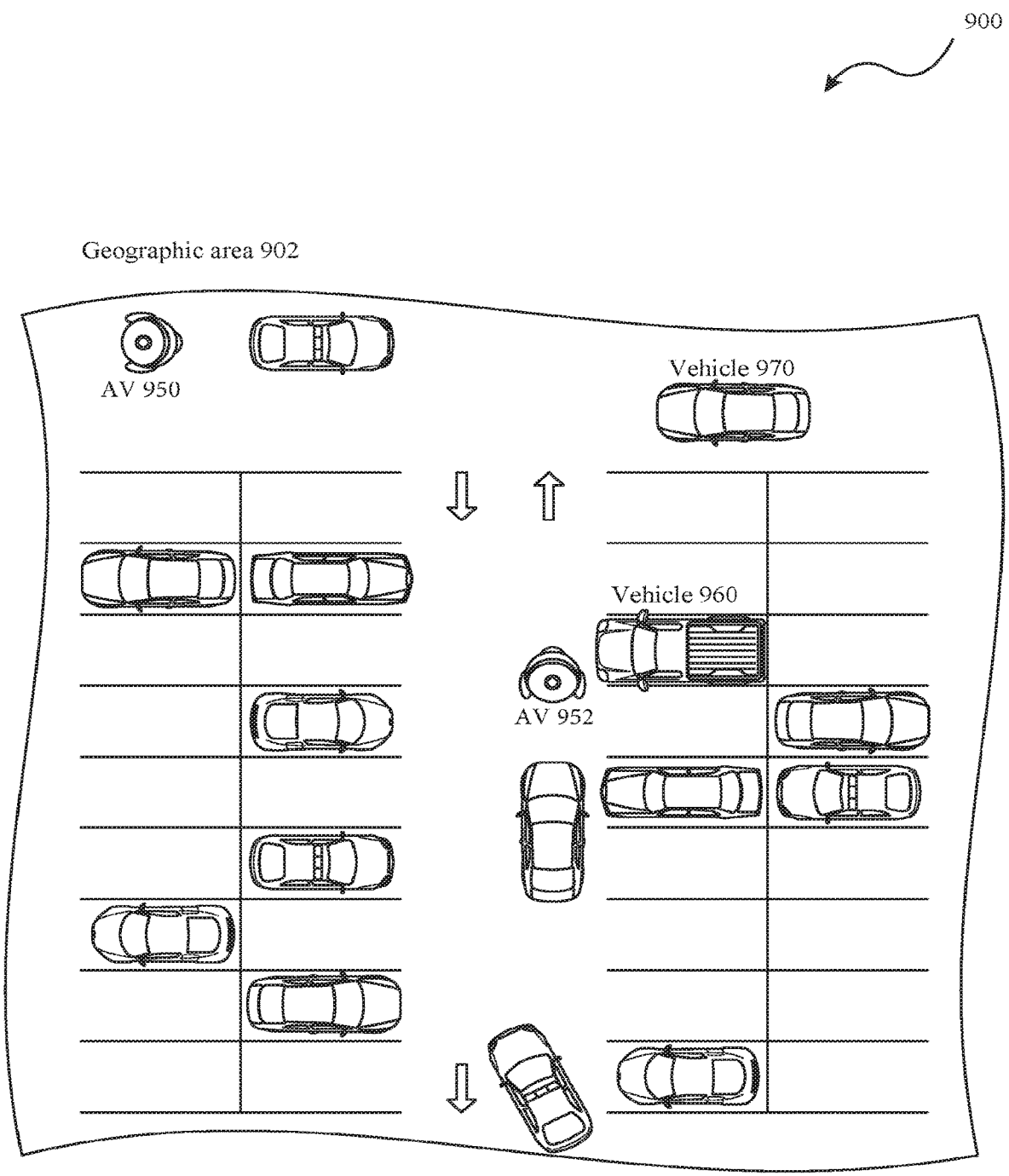
FIG. 9 is an example system for parking enforcement within a geographic area.

FIG. 9 is an example system 900 for parking enforcement within a geographic area 902. In some aspects cameras track: the vehicles entering and exiting a parking lot to facilitate payment for duration; the parking spaces in a parking lot to detect occupancy and any parking features. Such features may include: overstaying vehicles, badly parked vehicles (e.g., illicitly parked, blocking ingress/egress of vehicles, vehicles parked not within boundaries, etc.), blacklisted vehicles, abandoned vehicles, pedestrians and cyclists, motor vehicles, parking lines, parking markers, parking signs, curbs, trees, roads, terrain, obstacles, side strips, bridge abutments, and road margins, traffic signs, signals, and/or the like. In some examples, recognition is performed by local hardware, or it is captured by local hardware and then performed in the cloud. In some examples, certain aspects of recognition are performed locally before being sent to the cloud. In some examples, the local hardware may be a raspberry pi micro computer, and may be used to perform edge-based computing. In some examples, the raspberry pi micro computer may be connected to a GOOGLE CORAL tensor processing unit, which may be used to compute machine learning in real-time.

In some aspects, when a feature is recognized, a system may notify an actionable recipient such as a valet, parking assistant, or autonomous vehicle. In some aspects, autonomous vehicles patrol the parking lot independently at regular intervals to scan for occupancy and anomalies. Such autonomous vehicles may include but are not limited to: ground-based machines, autonomous motor vehicles, autonomous robot valet or towing machines, unmanned aircraft systems (UAVs or 'Drones') or other aerial machines, and/or the like.

In some aspects, an autonomous vehicle (AV) 950 and AV 952 maneuvers within geographic area 902. In some examples, AV 950-952 corresponds with vehicle 250 and/or vehicles 350-355. In some examples, the AV 950-952 includes sensors as described above with respect to FIG. 2-3, and captures images within geographic area 902 to detect parking features. Images may be processed as described above with respect to FIGS. 3-4.

In some aspects, AV 950 identifies license plates of parked vehicles and cross-references them with license plates stored in a database. Using the database, it may be determined whether one or more vehicles within a parking lot are overstaying or are blacklisted based on information stored check-in and check-out times and/or outstanding fees and fines. In some aspects, based on a threshold time (e.g., 0.5-3 hours), it may be determined that a first vehicle, vehicle 960 has exceeded the threshold time or is on a blacklist. In some aspects, illicitly parked vehicles may be identified. In some examples, based on the location of a vehicle, it may be determined that a vehicle, such as vehicle 970, is parked illegally, not within a boundary, and/or the like and/or combinations thereof. In some examples, a citation may be issued to vehicle 960 based on the extent of overstaying, based on particular violations, such as parking over a line, interfering with ingress or egress, and/or the like. Calculations for the citation may depend on city-specific citations, private citation calculations, and/or the like. In some examples, it may be determined that vehicle 960 requires towing. In some aspects, AV 950 has extendable arms or a towing platform that it may use to mount one or more vehicles on for immediate towing or relocating within the lot. In some examples, vehicle 960 may require towing based on exceeding the threshold time, receiving multiple citations, being parked illegally, being parked not within a boundary, displaying signs of abandonment, and/or the like. In some examples, a vehicle may display signs of abandonment through identification of certain vehicle features including major parts (e.g., engine or doors) missing, flat tires, expired license plates or registration tags, trash bags or cardboard in the place of a window, and/or the like. Some advantages of disclosed aspects may include more automated enforcement, reducing accidents, increasing parking availability, reducing cost, reduced traffic, and faster processing of parking transactions.

As discussed above and further emphasized here, FIGS. 1-9 are merely examples, and should not unduly limit, the scope of the claims. Although illustrative examples have been shown and described, a wide range of modification, change and substitution is contemplated in the foregoing disclosure and in some instances, some features of some aspects may be employed without a corresponding use of other features. One of ordinary skill in the art would recognize many variations, alternatives, and modifications. Thus, the scope of the invention should be limited only by the following claims, and it is appropriate that the claims be construed broadly and in a manner consistent with the scope of the aspects disclosed herein.

In the foregoing description, specific details are set forth describing some aspects consistent with the present disclosure. It will be apparent, however, to one skilled in the art that some aspects may be practiced without some or all of these specific details. The specific aspects disclosed herein are meant to be illustrative, but not limiting. Phrases including "such as" and "for example" are intended to be non-exclusive, and not, limit aspects to the set of things listed within those phrases. One skilled in the art may realize other elements that, although not specifically described here, are within the scope and the spirit of this disclosure. In addition, to avoid unnecessary repetition, one or more features shown and described in association with one example may be incorporated into other examples unless specifically described otherwise or if the one or more features would make an example non-functional. Furthermore, other patents and patent applications may be incorporated by reference in order to avoid unnecessary description; the present disclosure's terms and definitions should take precedence over any terms and definitions used in such references, when in conflict with the present disclosure.

For purposes of this disclosure, a wireless device may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, a wireless device may be a personal computer, a portable digital assistant (PDA), a consumer electronic device, a display device or monitor, a smartphone, or any other suitable device and may vary in size, shape, performance, functionality, and price. The wireless device may include memory, one or more processing resources such as a central processing unit (CPU) or hardware or software control logic. Additional components of the wireless device may include one or more storage devices, one or more communications ports for communicating with external devices as well as various input and output (I/O) devices, such as a keyboard, a mouse, a touchscreen, button inputs, a microphone, a motion sensor, and/or a video display.

What is claimed:

1. A computerized vehicle management system, comprising:
    a non-transitory memory; and
    one or more processors coupled to the non-transitory memory and configured to execute instructions to perform operations comprising:
        receiving a request for an available parking space for a vehicle from a user device associated with the vehicle, the request including user preferences for the available parking space at a first location within a geographic area;
        transmitting a prompt to a user account associated with the user device to verify a parking fee transaction, the prompt including price and hours information associated with a service at the available parking space; wherein the price and hours information are based on vehicle specific parameters and user preferences stored in the vehicle-user account;
        capturing, using one or more cameras, first image data associated with the vehicle;
        providing the image data associated with the vehicle to a computer vision machine learning model running on a processor located proximate to the available parking space to determine vehicle specific parameters associated with the vehicle;
        determining:
            i) if a user account identified by the vehicle specific parameters determined by the computer vision machine learning model matches a vehicle-user account stored in the computerized vehicle management system by comparing the vehicle specific parameters associated with the vehicle against a vehicle-user account database included in the computerized vehicle management system, the vehicle specific parameters including a license plate and at least one other parameter other than the license plate; and
            ii) that the first location is within proximity to the user device associated with the vehicle based on short-range wireless communication between the user device and an access control mechanism; and
        responsive to determining both i) and ii), transmitting instructions to the access control mechanism at the geographic area to permit access to the first location by the vehicle.

2. The computerized vehicle management system of claim 1, the operations further comprising:
    determining that the vehicle is not associated with the user account stored in the computerized vehicle management system;
    in response to determining the vehicle is not associated with the user account stored in the computerized vehicle management system, determining that the first location is within the threshold distance to the mobile user device associated with the user associated with the vehicle; and
    transmitting a second prompt to the mobile user device, wherein the second prompt is configured to auto-fill the vehicle specific parameters into a user request to create a new user account in the computerized vehicle management system.

3. The computerized vehicle management system of claim 1, the operations further comprising:
    determining that the vehicle is not associated with the user account stored in the computerized vehicle management system; and
    in response to determining the vehicle is not associated with the user account stored in the computerized vehicle management system, enabling the user associated with the vehicle to make a parking payment without creating the user account in the computerized vehicle management system.

4. The computerized vehicle management system of claim 1, further comprising charging a fee to the user account based on the price and hours information.

5. The computerized vehicle management system of claim 1, wherein the operations further comprising:
    identifying a user status associated with the user account; and
    selecting, from one or more parking locations, a parking location based on the user status.

6. The computerized vehicle management system of claim 1,
    wherein the service at the available parking space includes at least one of: parking services, refueling or charging of the vehicle, or vehicle cleaning.

7. The computerized vehicle management system of claim 1, wherein the request for the available parking space includes information associated with the vehicle including at least one of the length and the width of the vehicle, a license plate number, Vehicle Identification Number (VIN), and a make and model of the vehicle to determine if the available parking space can fit the vehicle.

8. The computerized vehicle management system of claim 1, the operations further comprising using the image data to determine the length and the width of the vehicle.

9. The computerized vehicle management system of claim 1, wherein the at least one other parameter other than the license plate is one selected from the group consisting of color, make, year, model, size, weight, engine type, VIN, and fuel type.

10. The computerized vehicle management system of claim 1, wherein the machine learning computer vision model is configured to determine at least one of the one or more vehicle specific parameters including damage to the vehicle, customizations to the vehicle, decals, or custom license plates.

11. The computerized vehicle management system of claim 1, wherein the short-range communication is established with Near Field Communications (NFC), RFID, or BLUETOOTH.

12. The computerized vehicle management system of claim 1, wherein responsive to determining both i) and ii), transmitting a transaction confirmation notification to the user device, the notification being configured to cause the transmitting of instructions to the access control mechanism.

13. A non-transitory computer-readable storage medium comprising instructions stored therein, which when executed by one or more processors, cause the processors to perform operations comprising:
- receiving a request for an available parking space for a vehicle from a user device associated with the vehicle, the request including user preferences for the available parking space at a first location within a geographic area;
- transmitting a prompt to a user account associated with the user device to verify a parking fee transaction, the prompt including price and hours information associated with a service at the available parking space; wherein the price and hours information are based on vehicle specific parameters and user preferences stored in the vehicle-user account;
- capturing, using one or more cameras, first image data associated with the vehicle;
- providing the image data associated with the vehicle to a computer vision machine learning model running on a processor located proximate to the available parking space to determine vehicle specific parameters associated with the vehicle;
- determining i) if a user account identified by the vehicle specific parameters determined by the computer vision machine learning model matches a vehicle-user account stored in the computerized vehicle management system by comparing the vehicle specific parameters against a vehicle-user account database included in the computerized vehicle management system, the vehicle specific parameters including a license plate and at least one other parameter other than the license plate, and ii) that the first location is within proximity to the user device associated with the vehicle based on short-range wireless communication between the user device and an access control mechanism; and
- responsive to the determining of i) and ii), transmitting instructions to the access control mechanism at the geographic area to permit access to the first location by the vehicle.

14. The non-transitory computer-readable storage medium of claim 13, wherein the service at the available parking space includes at least one of: parking services, refueling or charging of the vehicle, or vehicle cleaning.

15. The non-transitory computer-readable storage medium of claim 13, wherein the request for the available parking space includes information associated with the vehicle including at least one of the length and the width of the vehicle, a license plate number, Vehicle Identification Number (VIN), and a make and model of the vehicle to determine if the available parking space can fit the vehicle.

16. The non-transitory computer-readable storage medium of claim 13, the operations further comprising using the image data to determine the length and the width of the vehicle.

17. The non-transitory computer-readable storage medium of claim 13, wherein the at least one other parameter other than the license plate is one selected from the group consisting of damage to the vehicle, customizations to the vehicle, decals, or features associated with a custom license plate holder.

18. The non-transitory computer-readable storage medium of claim 13 wherein the short-range communication is established with Near Field Communications (NFC), RFID, or BLUETOOTH.

19. The non-transitory computer-readable storage medium of claim 13 transmitting a transaction confirmation notification to the user device, the notification being configured to cause the transmitting of instructions to the access control and further wherein the prompt is further configured to allow for credit card information to be auto-filled.

* * * * *